US010549453B2

(12) United States Patent
Tomiyama et al.

(10) Patent No.: US 10,549,453 B2
(45) Date of Patent: Feb. 4, 2020

(54) SIMULATION APPARATUS, SIMULATION METHOD AND NON-TRANSITORY COMPUTER-READABLE MEDIUM HAVING SIMULATION PROGRAM FOR FLUID-FLOW ANALYSIS OF MATERIAL IN KNEADING DEVICE

(71) Applicant: THE JAPAN STEEL WORKS, LTD., Shinagawa-ku, Tokyo (JP)

(72) Inventors: Hideki Tomiyama, Hiroshima (JP); Yohei Fukuzawa, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 723 days.

(21) Appl. No.: 14/937,217

(22) Filed: Nov. 10, 2015

(65) Prior Publication Data

US 2016/0132621 A1 May 12, 2016

(30) Foreign Application Priority Data

Nov. 11, 2014 (JP) .................................. 2014-229018

(51) Int. Cl.
*B29B 7/48* (2006.01)
*B29C 48/40* (2019.01)
(Continued)

(52) U.S. Cl.
CPC ............ *B29B 7/48* (2013.01); *B29C 48/2513* (2019.02); *B29C 48/2517* (2019.02);
(Continued)

(58) Field of Classification Search
CPC ............ B29C 47/0844; B29C 47/6056; B29C 47/082; B29C 47/92; B29C 47/0861;
(Continued)

(56) References Cited

U.S. PATENT DOCUMENTS 5,835,379 A * 11/1998 Nakano ................. B29C 45/766
264/328.1
2003/0171877 A1 * 9/2003 Adedeji .................. B29C 45/76
702/27

(Continued)

FOREIGN PATENT DOCUMENTS

JP 3-288620 A 12/1991
JP 4-364921 A 12/1992

(Continued)

OTHER PUBLICATIONS

Wang, Moran, and Zhixin Li. "Simulations for gas flows in microgeometries using the direct simulation Monte Carlo method." International Journal of Heat and Fluid Flow 25.6 (2004). pp. 975-985.*

(Continued)

*Primary Examiner* — Kamini S Shah
*Assistant Examiner* — John E Johansen
(74) *Attorney, Agent, or Firm* — Sughrue Mion, PLLC

(57) ABSTRACT

A simulation apparatus includes an 1D analysis unit which performs a low-dimensional fluid-flow analysis of material in an arithmetic object field of a kneading device, based on setting information including physical property of the material, and configuration data and an operation condition of the kneading device for kneading the material, an area selection unit which receives selection of an object area as an object of a high-dimensional fluid-flow analysis in the arithmetic object field, and a 3D analysis unit which extracts physical quantities of the material relating to the object area, based on a result of the low-dimensional fluid-flow analysis, and performs a high-dimensional fluid-flow analysis of the material in the object area, based on the extracted physical quantities and the setting information.

6 Claims, 19 Drawing Sheets

(51) Int. Cl.
  *B29C 48/505* (2019.01)
  *B29C 48/25* (2019.01)
  *B29C 48/92* (2019.01)
  *B29C 48/57* (2019.01)
(52) U.S. Cl.
  CPC ........ *B29C 48/2561* (2019.02); *B29C 48/402* (2019.02); *B29C 48/507* (2019.02); *B29C 48/57* (2019.02); *B29C 48/92* (2019.02); *B29C 2948/922* (2019.02); *B29C 2948/92019* (2019.02); *B29C 2948/9238* (2019.02); *B29C 2948/92104* (2019.02); *B29C 2948/92209* (2019.02)
(58) Field of Classification Search
  CPC .............. B29C 47/402; B29C 47/0857; B29C 2947/922; B29C 2947/92104; B29C 2947/9238; B29C 2947/92209; B29C 2947/92019; B29C 48/2517; B29C 48/92; B29C 48/57; B29C 48/2561; B29C 48/2513; B29C 48/402; B29C 48/507; B29C 2948/92209; B29C 2948/92019; B29C 2948/92104; B29C 2948/922; B29C 2948/9238; B29B 7/48
  USPC ............................................................. 703/9
  See application file for complete search history.

(56) References Cited

U.S. PATENT DOCUMENTS

| | | | | |
|---|---|---|---|---|
| 2007/0141526 | A1* | 6/2007 | Eisenberg | A61C 7/00 433/24 |
| 2012/0179649 | A1 | 7/2012 | Padmanabhan et al. | |
| 2014/0047407 | A1* | 2/2014 | Danielsson | G06F 8/00 717/104 |

FOREIGN PATENT DOCUMENTS

| | | |
|---|---|---|
| JP | 9-29819 A | 2/1997 |
| JP | 2001-1386 A | 1/2001 |
| JP | 2002-214107 A | 7/2002 |
| JP | 3679392 B2 | 8/2005 |
| JP | 3712762 B2 | 11/2005 |
| JP | 2006-103316 A | 4/2006 |
| JP | 2006-164219 A | 6/2006 |
| JP | 4414408 B2 | 2/2010 |

OTHER PUBLICATIONS

Bravo, V. L., A. N. Hrymak, and J. D. Wright. "Numerical simulation of pressure and velocity profiles in kneading elements of a co-rotating twin screw extruder." Polymer Engineering & Science 40.2 (2000). pp. 525-541. (Year: 2000).*

Fukuoka, Takamasa. "Numerical analysis of a reactive extrusion process. Part II: Simulations and verifications for the twin screw extrusion." Polymer Engineering & Science 40.12 (2000). pp. 2524-2538. (Year: 2000).*

Search Report dated Apr. 13, 2016 issued by the European Patent Office in counterpart European Patent Application No. 15194031.9.

Kazumori Funatsu et al; "3-D Numerical Analysis on the Mixing Performance for Assemblies With Filled Zone of Right-Handed and Left-Handed Double-Flighted Screws and Kneading Blocks in Twin-Screw Extruders"; Polymer Engineering and Science; Apr. 2002; vol. 42; No. 4; pp. 707-723.

Communication dated Sep. 6, 2016, from the Japanese Patent Office in counterpart application No. 2014-229018.

* cited by examiner

FIG. 7

Analysis Wizard

Resin Physical Property Data

Please input resin physical property data.

| Solid Density (O) | 920 | kg/m^3 |
| Solid Thermal Conductivity (T) | 0.380 | J/m.sec.K |
| Solid Specific Heat (H) | 3000.00 | J/kg.K |
| Melt Density (M) | 780 | kg/m^3 |
| Melt Thermal Conductivity (C) | 0.285 | J/m.sec.K |
| Melt Specific Heat (E) | 2800.00 | J/kg.K |
| Melting Heat Quantity (F) | 590000 | J/kg |
| Melting Point (L) | 130 | deg.C |

Save Resin Data (S)
Register Resin Data (R)

Cancel    < Back (B)    Next (N) >    Finish

FIG. 8

SIMULATION APPARATUS, SIMULATION METHOD AND NON-TRANSITORY COMPUTER-READABLE MEDIUM HAVING SIMULATION PROGRAM FOR FLUID-FLOW ANALYSIS OF MATERIAL IN KNEADING DEVICE

CROSS-REFERENCE TO RELATED APPLICATIONS

This application claims priority from Japanese Patent Application No. 2014-229018 filed on Nov. 11, 2014, the entire subject-matter of which is incorporated herein by reference.

TECHNICAL FIELD

The present invention relates to a simulation apparatus, a simulation method and a simulation program each of which performs a fluid-flow analysis of material to be molten and plasticized in a kneading device for kneading the material such as resin material, in particular, in an extruder or an injection molding device having a screw within a cylinder containing the material.

BACKGROUND

There is a case that physical quantities such as velocity and pressure distributions of resin material, that is molten and plasticized by rotating a screw provided in an extruder or an injection molding device, is calculated, and then prediction of a molding process such as prediction of physical properties of a kneaded state and velocity and pressure distributions, etc. is performed. In this case, analysis software using an analysis method such as an FAN method (Flow Analysis Network Method) or an FEM (finite element method) is generally employed.

The FAN method is representatively described in Japanese Patent No. 3,679,392, Japanese Patent No. 4,414,408 and JP-A-09-029819. According to the FAN method, for example, in a case of using an extruder as an analysis object, distribution states of a fill factor, a pressure, a temperature, a solid-phase occupancy, a residence time, a torque, a power, etc. within the extruder are arithmetically predicted as respective average values in a cross-section along the axial direction of the extruder, based on a device configuration, an operation condition and physical properties of material of the extruder. As simulation softwares on the market using this method, there are known, for example, "TEX-FAN" developed by Japan Steel Works, Ltd., "EXTRUCAD" and "NEXTRUCAD" developed by PolyDynamics INC., "Win-SSD" of Polymer Processing Institute, "REX" of Paderborn University in Germany and "EXTRUDER" of Compuplast, and "AKRO-CO-TWIN SCREW" developed by Akron University in the United States.

According to the FAN method, for example, in a case of using an extruder as an analysis object, a flow path existing between a screw and a cylinder of the extruder is cut along a circumferential direction of the cylinder and thus modeled into two plates, that is, upper and lower plates respectively corresponding to the cylinder wall surface and the screw surface. In a state that these two plates are arranged to have an interval of a groove depth of the screw, a fluid flow state is arithmetically operated under a condition that the plate corresponding to the screw surface is translated by a distance corresponding to a rotation speed of the screw. In this method, in a case of noticing an element at a certain cross-section of the flow path, a fluid pressure, a residence time and a fluid flow rate flowing to the downstream side, etc. within this element can be calculated by solving a balance between a flow rate of the fluid (resin material in a molten state) flowing from the upstream side and a conveying amount of the fluid provided by the element itself. By sequentially executing this calculation with respect to the flow-path element from the upstream side to the downstream side or vice versa, physical quantities of the entire extruder can be calculated finally. In this manner, as the physical quantities in the axial direction of the entire extruder are outputted, this method is considered as an one-dimensional analysis (1D analysis).

In contrast, according to the FEM, a flow path as an analysis object is entirely divide into lattice elements, then nodes within the elements are set as calculation points, then the law of conservation of mass and the law of conservation of momentum is discretely applied to each of all the nodes, and physical quantities of the entire flow path can be calculated by solving a simultaneous equation for each of the calculation points. Thus this method is considered as a kind of a lattice element method. As the lattice element method, another method such as an FVM (finite volume method) or an FDM (finite difference method) is applied in place of the FEM, depending on software. As an analysis of an extruder using the methods, there is known a case achieved by the research team of Kyushu University represented by K. Funatsu, S. Kihara, M. Miyazaki, S. Katsuki and T. Kajiwara, Polym. Eng. Sci., 42, 707 (2002). As general-purpose softwares, for example, "POLYFLOW" of ANSYS Inc. and "SCREWFLOW-MULTI" of R-flow Corporation Ltd. are known. A fluid-flow analysis according to this method is implemented to a two-dimensional (2D) analysis or a three-dimensional (3D) analysis. In particular, due to remarkable improvement in efficiency of computer hardware in recent years, this method is applied to a 3D analysis in general.

Concerning the analysis according to the FAN method and the FEM, as the FAN method can obtain physical quantities in the axial direction of an entire area of an extruder, this method is often used in order to grasp transition tendency of physical properties of resin within an extruder or to predict quality of the extrusion resin. In contrast, as the FEM can hardly perform prediction of an entire area of an extruder even under a current environment of computer efficiency. Thus, the FEM is mainly used in order to perform prediction of a two-dimensional cross-section of a kneaded portion or to extract a kneaded area three-dimensionally and perform a 3D analysis, thus predicting a detailed fluid-flow state of thus locally extracted area.

However, respective analysis software using the FAN method and the FEM as described above is applied to respective characteristic analyses, that is, respective analyses matched to information required by a user. Thus, an integrated analysis incorporating merits of the both methods cannot be realized by single software. In other words, it is impossible to simultaneously implement both a low-dimensional analysis such as the 1D analysis and a high-dimensional analysis such as the 3D analysis based on the same software. Accordingly, in a case of performing both a low-dimensional analysis and a high-dimensional analysis under the same operation conditions of an extruder, firstly parameters are set manually so that the operation conditions become the same between the respective software. Then outputted results from the respective software are classified separately. In this manner, finally an analysis executor is required to obtain physical quantity evaluation of resin in the entirety of an extruder and also evaluation of local kneading behavior, by classifying and processing outputted data from the respective software separately. Such a work is very complicated.

SUMMARY

An object of the invention is to provide a simulation apparatus, a simulation method and a simulation program each of which can efficiently realize both a low-dimensional fluid-flow analysis and a high-dimensional fluid-flow analysis under the same operation conditions of an extruder.

According to one illustrative aspect of the invention, there is provided a simulation apparatus for performing a fluid-flow analysis of material, comprising: a low-dimensional analysis unit configured to perform a low-dimensional fluid-flow analysis of the material in an arithmetic object field of a kneading device based on setting information, the setting information including: physical property of the material; and configuration data and an operation condition of the kneading device for kneading the material; a selection receiving unit configured to receive, after or before the low-dimensional fluid-flow analysis, selection of an object area as an object of a high-dimensional fluid-flow analysis in the arithmetic object field; a physical quantity extraction unit configured to extract physical quantities of the material relating to the object area, based on a result of the low-dimensional fluid-flow analysis; and a high-dimensional analysis unit configured to perform a high-dimensional fluid-flow analysis of the material in the object area, based on the extracted physical quantities and the setting information.

According to another illustrative aspect of the invention, there is provided a simulating method executed by a simulation apparatus for performing a fluid-flow analysis of material, the method comprising: performing a low-dimensional fluid-flow analysis of the material in an arithmetic object field of a kneading device, based on setting information, the setting information including: physical property of the material; and configuration data and an operation condition of the kneading device for kneading the material; receiving, after or before the low-dimensional fluid-flow analysis, selection of an object area as an object of a high-dimensional fluid-flow analysis in the arithmetic object field; extracting physical quantities of the material relating to the object area, based on a result of the low-dimensional fluid-flow analysis; and performing a high-dimensional fluid-flow analysis of the material in the object area, based on the extracted physical quantities and the setting information.

According to still another illustrative aspect of the invention, there is provided a simulation program for executing a fluid-flow analysis of material, the simulation program causing a computer to function as: a low-dimensional analysis unit which performs a low-dimensional fluid-flow analysis of the material in an arithmetic object field of a kneading device, based on setting information, the setting information including: physical property of the material; and configuration data and an operation condition of the kneading device for kneading the material; a selection receiving unit configured to receive, after or before the low-dimensional fluid-flow analysis, selection of an object area as an object of a high-dimensional fluid-flow analysis in the arithmetic object field; a physical quantity extraction unit configured to extract physical quantities of the material relating to the object area, based on a result of the low-dimensional fluid-flow analysis; and a high-dimensional analysis unit configured to perform a high-dimensional fluid-flow analysis of the material in the object area, based on the extracted physical quantities and the setting information.

According to this invention, both a low-dimensional analysis and a high-dimensional analysis can be realized efficiently under the same operation conditions of an extruder.

BRIEF DESCRIPTION OF THE DRAWINGS

FIG. 7 is a diagram showing a setting screen of resin physical property data;

FIG. 8 is a diagram showing a setting screen of operation conditions;

DETAILED DESCRIPTION

Hereinafter an embodiment according to the invention will be explained with reference to accompanying drawings.

In this embodiment, explanation is made as to a case that the invention is applied to, for example, an extruder simulation apparatus which analyzes a twin-screw extruder as an analysis object. The extruder simulation apparatus predicts fluid-flow behavior of resin material which is kneaded and molten-plasticized in a screw kneading field (two screws and a flow path space formed within a cylinder) as an arithmetic object field. Incidentally, the analysis object is not limited to the twin-screw type but may be a single-screw type or a multi-screw type such as a triple-screw type. Further, the analysis object is not limited to the extruder but may be another optional device such as a kneading device, a plasticizing device, an injection molding device so long as the device can flow material such as organic substance including resin or the like or inorganic substance. Hereinafter this embodiment will be explained in detail with reference to accompanying drawings.

(Device Configuration)

Figure 1:
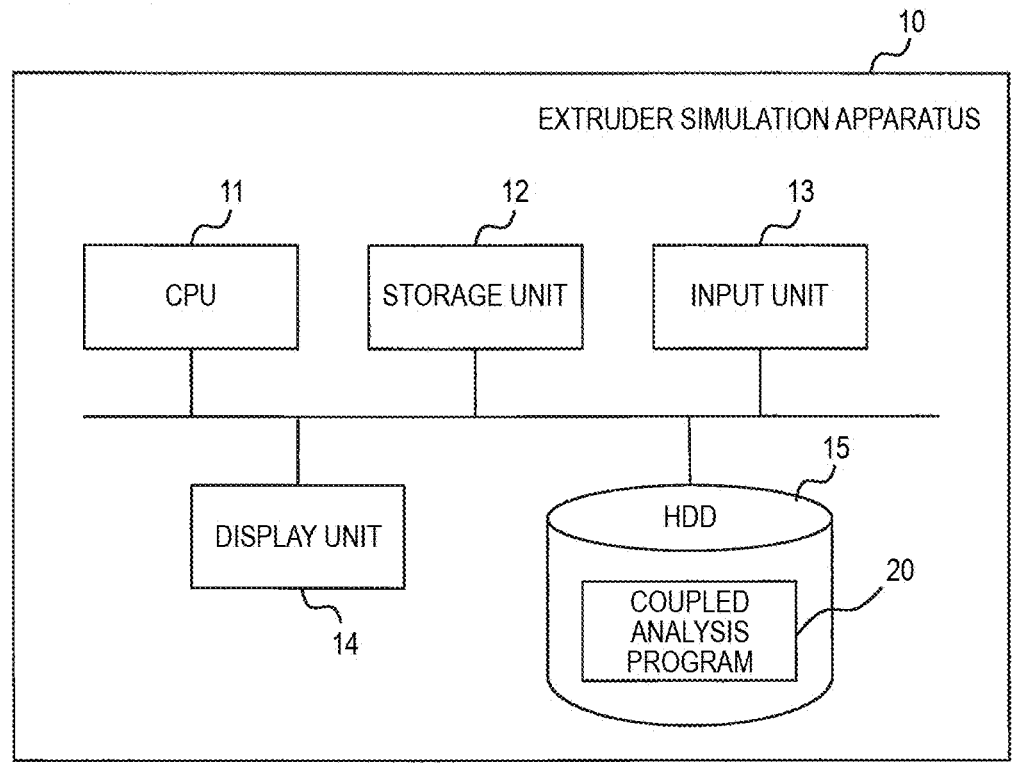
FIG. 1 is a block diagram showing hardware configuration of an extruder simulation apparatus according to the embodiment.

FIG. 1 is a block diagram showing hardware configuration of the extruder simulation apparatus according to the embodiment. As shown in FIG. 1, the extruder simulation apparatus 10 includes a CPU (Central Processing Unit) 11, a storage unit 12, an input unit 13, a display unit 14 and an HDD (Hard Disk Drive) 15.

The CPU 11 executes various kinds of programs such as OS (Operating System), BIOS (Basic Input/output System), application software programs and a coupled analysis program described later each developed on the storage unit 12, thus controlling the extruder simulation apparatus 10. The storage unit 12 is a volatile memory such as a so-called RAM (Random Access Memory) and used as a work area of the programs to be executed.

The input unit 13 receives an input from a user (analysis executor) using the extruder simulation apparatus 10. For example, the input unit is a mouse as a pointing device for designating a particular position on a display or a keyboard where plural keys allotted with characters and particular functions are arranged.

The display unit 14 is an output device such as a display for displaying a GUI (Graphic User Interface) of the OS or the application programs operated on the OS, a setting screen, a confirmation screen, analysis results, etc. shown in FIGS. 4 to 16 described later, in a visually recognizable manner for a user.

The HDD 15 is a so-called nonvolatile storage area which stores the coupled analysis program 20, various kinds of parameters used in an 1D-3D coupled analysis processing described later and data such as various kinds of physical quantities calculated in this processing.

The coupled analysis program 20 is the application software program developed on the storage unit 12 when selectively started by a user, thus executing the 1D-3D coupled analysis processing. The 1D-3D coupled analysis processing is performed by coupling an 1D solution based on an FAN (Flow Analysis Network) method analysis and a 3D solution based on an FEM (Finite Element Method) analysis. That is, the coupled analysis program 20 employs an arithmetic method achieving both an 1D fluid-flow analysis function and a 3D fluid-flow analysis function based on the same software. Specifically, in the 1D-3D coupled analysis processing, after the 1D fluid-flow analysis processing, a partial area of an arithmetic object field is extracted from the analysis results. Then, operation conditions such as a supply quantity (extrusion quantity) of resin, a screw rotation speed and a setting temperature of a cylinder set at a time of executing the 1D fluid-flow analysis, and resin physical properties such as a viscosity model formula and its parameters are automatically set as 3D fluid-flow analysis conditions as they are. Further, the analysis results such as a resin temperature and a resin pressure obtained by the 1D fluid-flow analysis processing are extracted as they are and automatically set as boundary conditions necessary for the 3D fluid-flow analysis, and then the 3D fluid-flow analysis is executed. In this manner, by applying the coupled analysis program 20 to the embodiment, both the 1D fluid-flow analysis processing and the 3D fluid-flow analysis processing can be executed under the same arithmetic conditions. As the three-dimensional evaluation can be performed locally with respect to the partial analysis area obtained from the 1D fluid-flow analysis processing, both physical quantity evaluation of resin in the entirety of the extruder and evaluation of local kneading behavior can be performed simultaneously.

(Functional Configuration)

Figure 2:
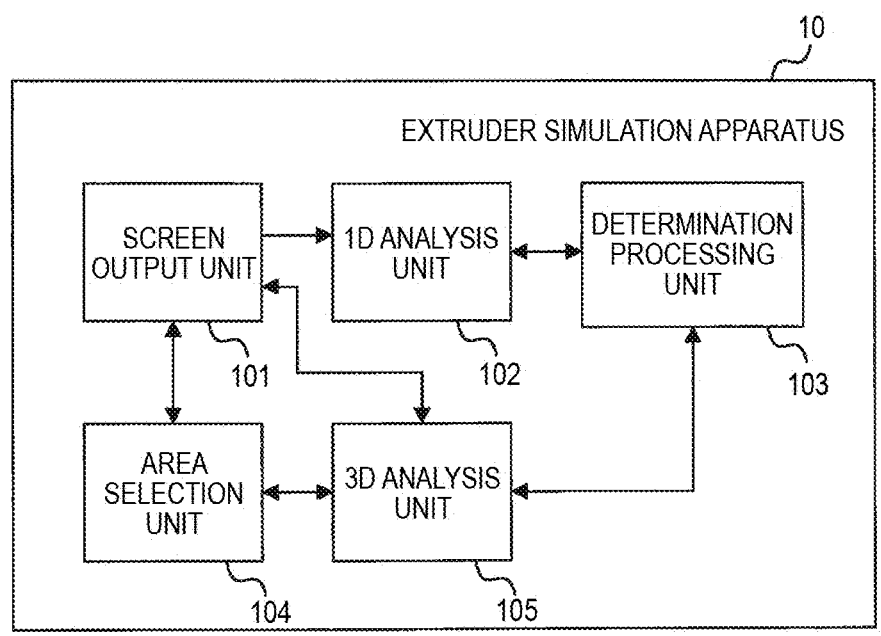
FIG. 2 is a functional block diagram showing functional configuration of the extruder simulation apparatus according to the embodiment.

Next, functional configuration of the extruder simulation apparatus 10 incorporating the coupled analysis program 20 will be explained. FIG. 2 is a functional block diagram showing the functional configuration of the extruder simulation apparatus according to the embodiment. As shown in FIG. 2, the extruder simulation apparatus 10 includes, as its functions, a screen output unit 101 which displays various kinds of screens on the display unit 14 and obtains setting parameters inputted therein, an 1D analysis unit 102 which executes the 1D fluid-flow analysis processing described later, a determination processing unit 103 which performs determination processings in various kinds of processings, an area selection unit 104 which receives selection of an object area of the 3D fluid-flow analysis processing described later, and a 3D analysis unit 105 which executes the 3D fluid-flow analysis processing described later. The functions are realized by cooperatively operating aforementioned hardware resource such as the CPU 11 and the storage unit 12 based on the coupled analysis program 20.

(1D-3D Coupled Analysis Processing)

Figure 3:
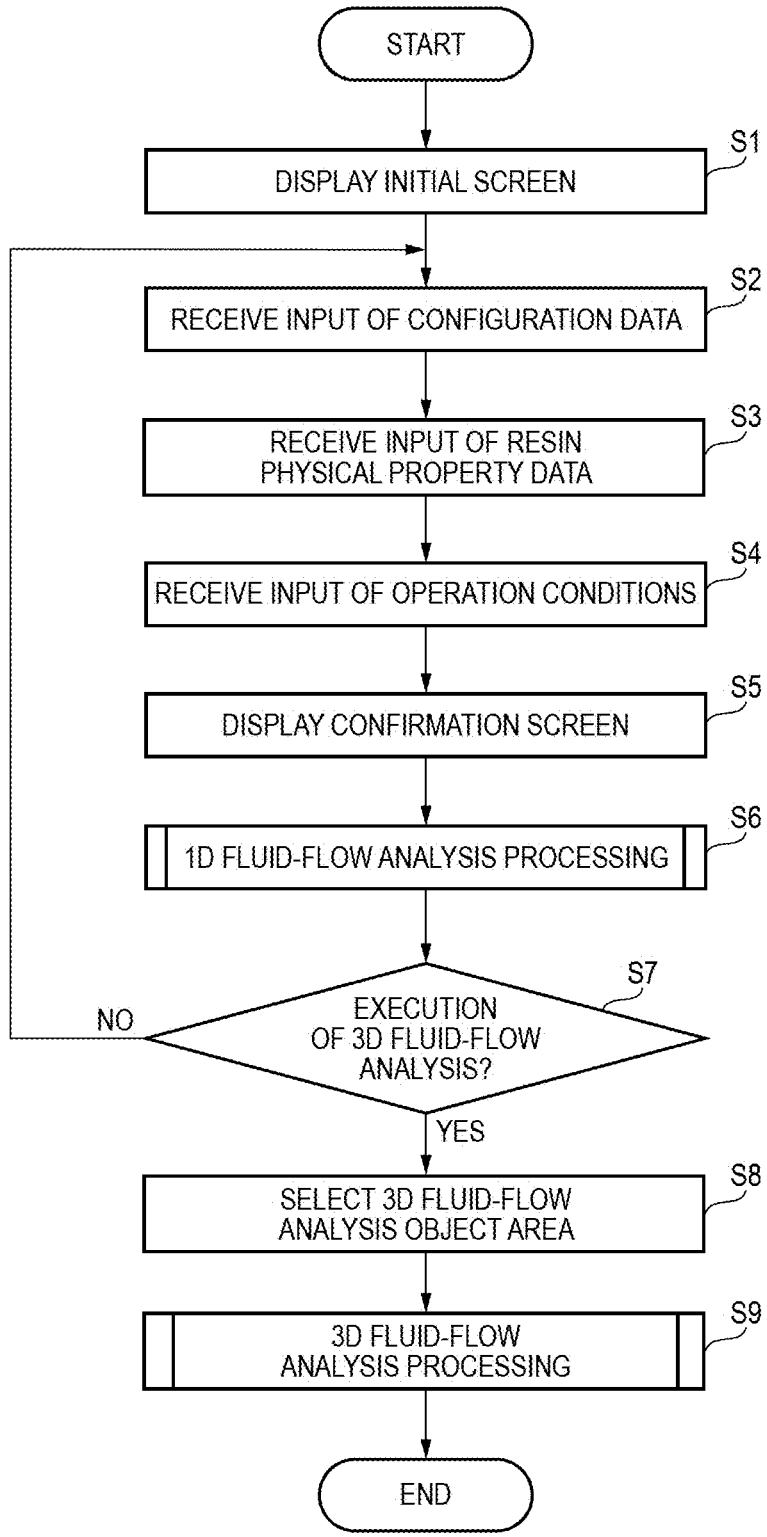
FIG. 3 is a flowchart showing an 1D-3D coupled analysis processing according to the embodiment.

Next, the 1D-3D coupled analysis processing executed by the respective functions of the extruder simulation apparatus 10 will be explained in detail with reference to FIGS. 3 to 16. FIG. 3 is a flowchart showing the 1D-3D coupled analysis processing according to the embodiment. In this embodiment, the 1D-3D coupled analysis processing is triggered when the extruder simulation apparatus 10 is started and the coupled analysis program 20 is executed. Firstly, when the coupled analysis program 20 is started, the screen output unit 101 displays a start screen (Tex-Fan window) shown in FIG. 4 on the display unit 14 (S1). In a case that a user selects an item "New Analysis" on this start screen, the screen output unit 101 displays a screw shape data preparation screen (Tex-Geo-[model, scw] window) on the display unit 14 and receives an input of screw configuration data necessary for the 1D fluid-flow analysis (S2). The item "New Analysis" is displayed so as to be selectable in a case that a user clicks and selects, for example, an item "File" shown in FIG. 4.

Figure 5:
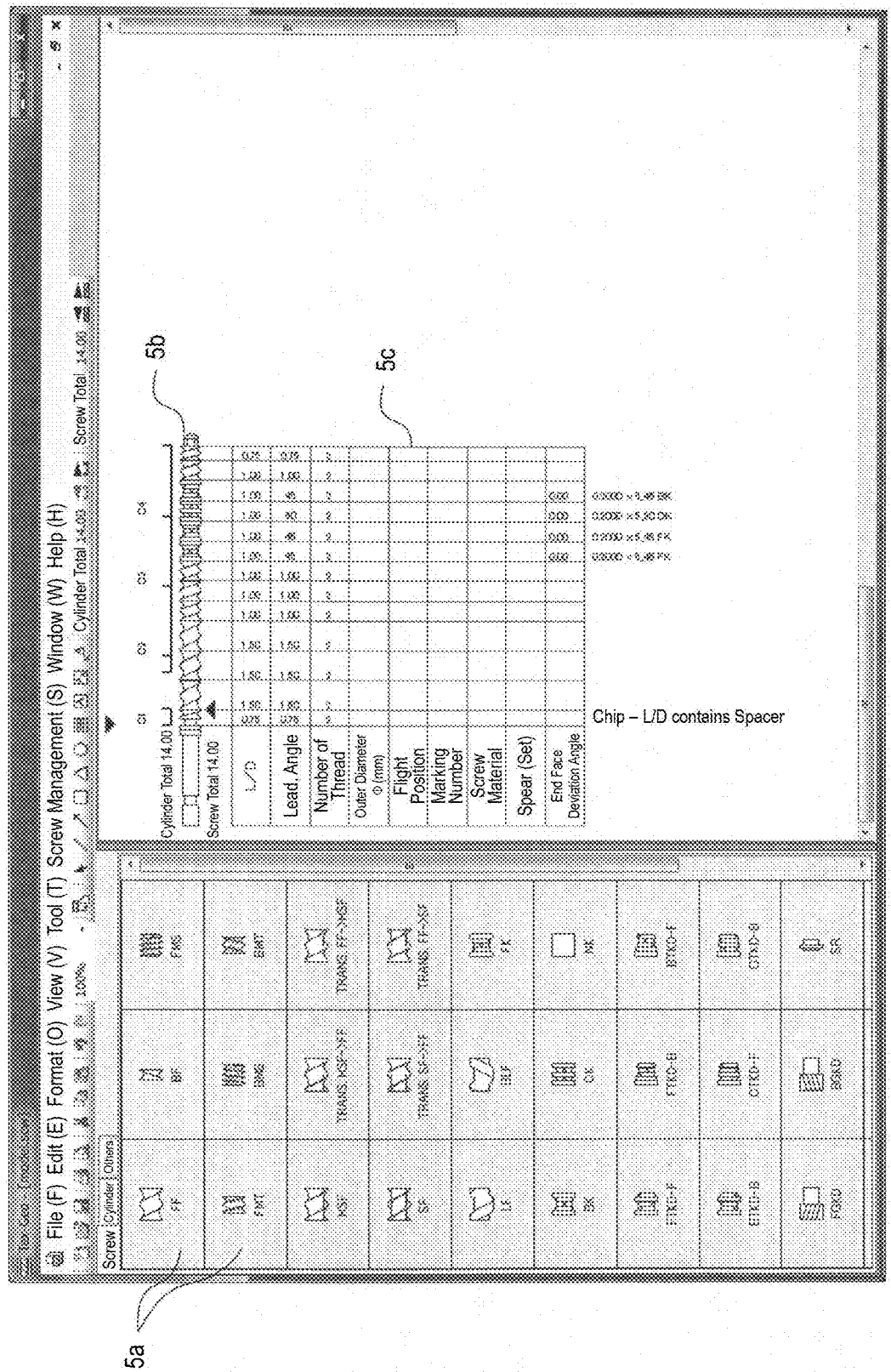
FIG. 5 is a diagram showing a screw shape data preparation screen.

According to the embodiment, in the screw shape data preparation screen, screw shape data relating to the arithmetic object field of the 1D fluid-flow analysis processing described later is prepared, using a technique disclosed in Japanese Patent No. 3,795,852 owned by the applicant of the present application. Briefly, the screen output unit 101 displays component pieces 5a shown in FIG. 5 representing various kinds of components configuring a screw so as to be selectable by a click operation using the input unit 13. Then, a user selects the component piece by clicking the displayed component piece and drags and drops the selected component piece to the right side on the screen while maintaining the clicked state, so that various kinds of the component pieces 5a are coupled and the screw shape data 5b is displayed. In a case of dropping each of the component pieces 5a, a property window 5c of the respective dropped component piece is displayed to allow input of the configuration data. In this embodiment, an L/D, a lead, an angle, an outer diameter, a flight position, a marking number, screw material, spear, an end face deviation angle, and so on are inputted as the configuration data. Incidentally, a cylinder diameter and a groove depth, etc. may also be inputted depending on the screw shape, that is, the component piece 5a to be selected. The technique of preparing the screw shape data is not limited to this technique but an optional known technique capable of preparing a screw shape may be employed. However, in view of a step of selecting an object area of the 3D fluid-flow analysis processing described later, it is preferable to employ a technique which enables a user to prepare visually recognizable and selectable screw shape data.

Figure 6:
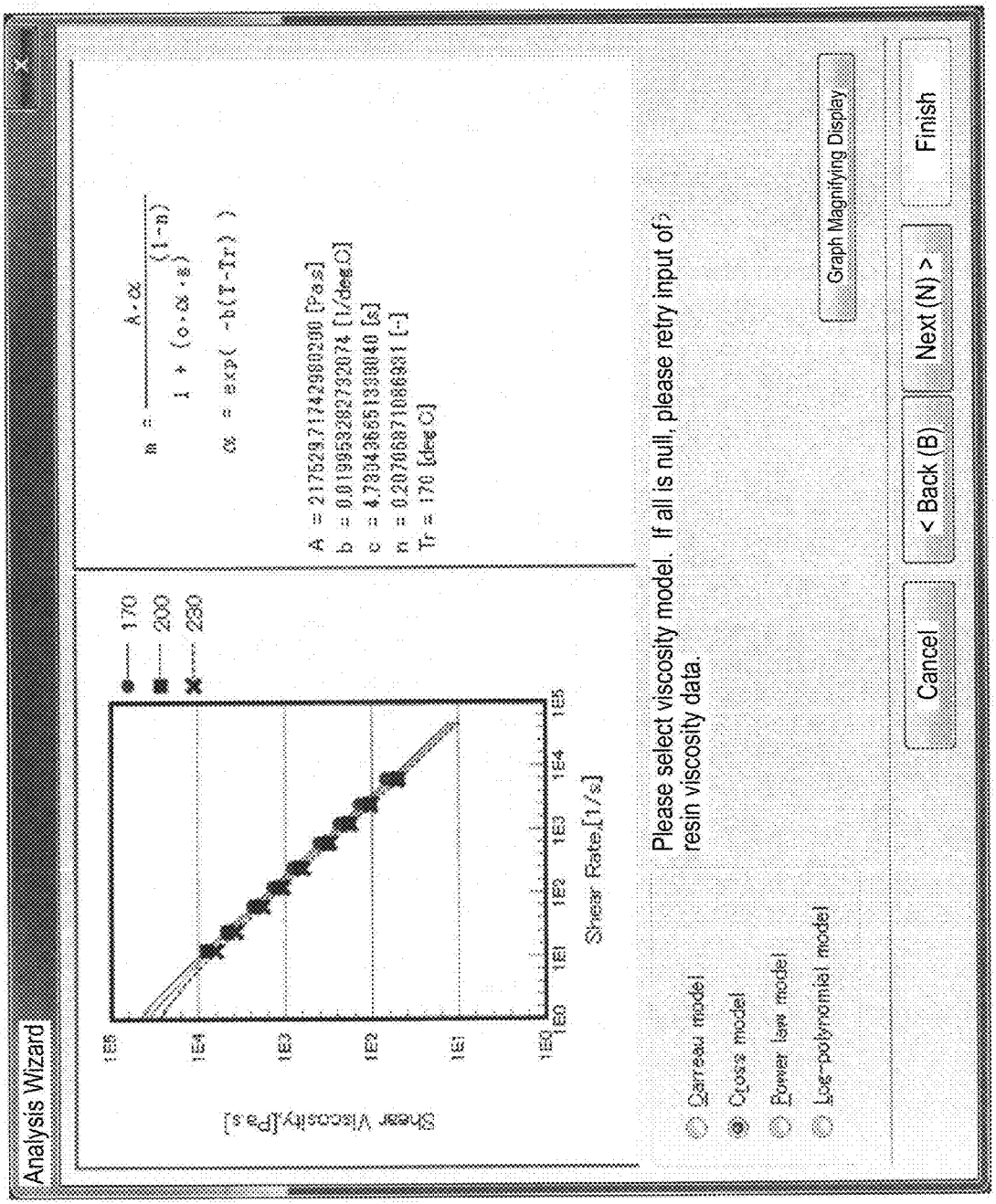
FIG. 6 is a diagram showing a display screen of a viscosity prediction curve.

In a case that the configuration data is inputted in this manner and a user selects "Next", the screen output unit 101 displays "Analysis Wizard" as another window. The screen output unit displays, in this analysis wizard, for example, a not-shown input screen of viscosity data of resin material, a display screen of a viscosity prediction curve as shown in FIG. 6, a setting screen of resin physical property data as shown in FIG. 7, and then receives inputs of various kinds of resin physical property data necessary for the 1D fluid-flow analysis (S3). The viscosity prediction curve shown in FIG. 6 is a prediction curve of a viscosity model formula which is subjected to an automatic parameter fitting based on the viscosity data of resin material inputted in the input screen of viscosity data that is displayed before the display screen of the viscosity prediction curve. Incidentally, the viscosity data to be inputted is, for example, shear viscosity data at shear rates of at least three kinds or more at each level, that is measured in advance under a temperature condition of at least two levels. In FIG. 7, a cross model is selected as the viscosity model formula. Further, in this embodiment, in the setting screen shown in FIG. 7, a solid density, a solid thermal conductivity, a solid specific heat, a melt density, a melt thermal conductivity, a melt specific heat, a melting heat quantity, a melting point, and so on are inputted as the resin physical property data. The input screen of viscosity data, the display screen and the setting screen are sequentially shifted in response to selection of a "Next" button provided in the "Analysis Wizard". In a case that "Cancel" is selected, the current window is closed. In contrast, in a case that "Return" is selected, the display returns to the most-recent various kinds of screens.

Figure 8:
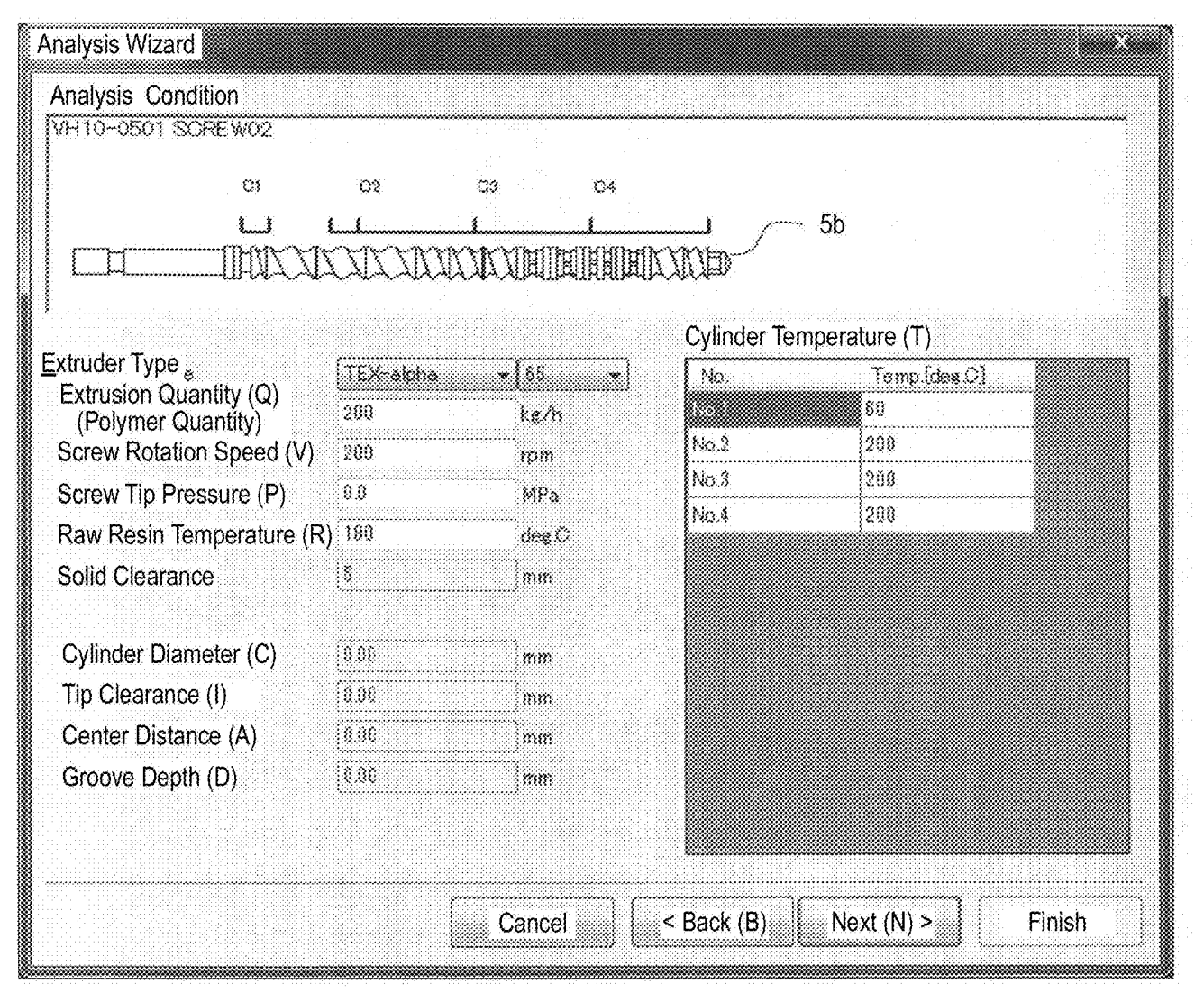

In a case that the resin physical property data is inputted and the "Next" button is selected by a user, as shown in FIG. 8, the screen output unit 101 displays a setting screen of operation conditions (analysis conditions) in an "Analysis Wizard" window, and receives inputs of various kinds of operation conditions necessary for the 1D fluid-flow analysis processing (S4). In this embodiment, as the operation conditions, an extruder type, an extrusion quantity, a screw rotation speed, a screw tip pressure, a raw resin temperature and cylinder temperatures at respective important portions of the screw are inputted. Further, as shown in FIG. 8, it is preferable to also show the screw shape data 5b prepared in the screw configuration data receiving processing in step S2 so that a user can visually grasp the respective important portions of the screw. Incidentally, a slot clearance, a cylinder diameter, a tip clearance, a center distance, a groove depth, etc. may also be inputted sequentially depending on the screw shape, that is, the component pieces 5a to be selected.

Figure 9:
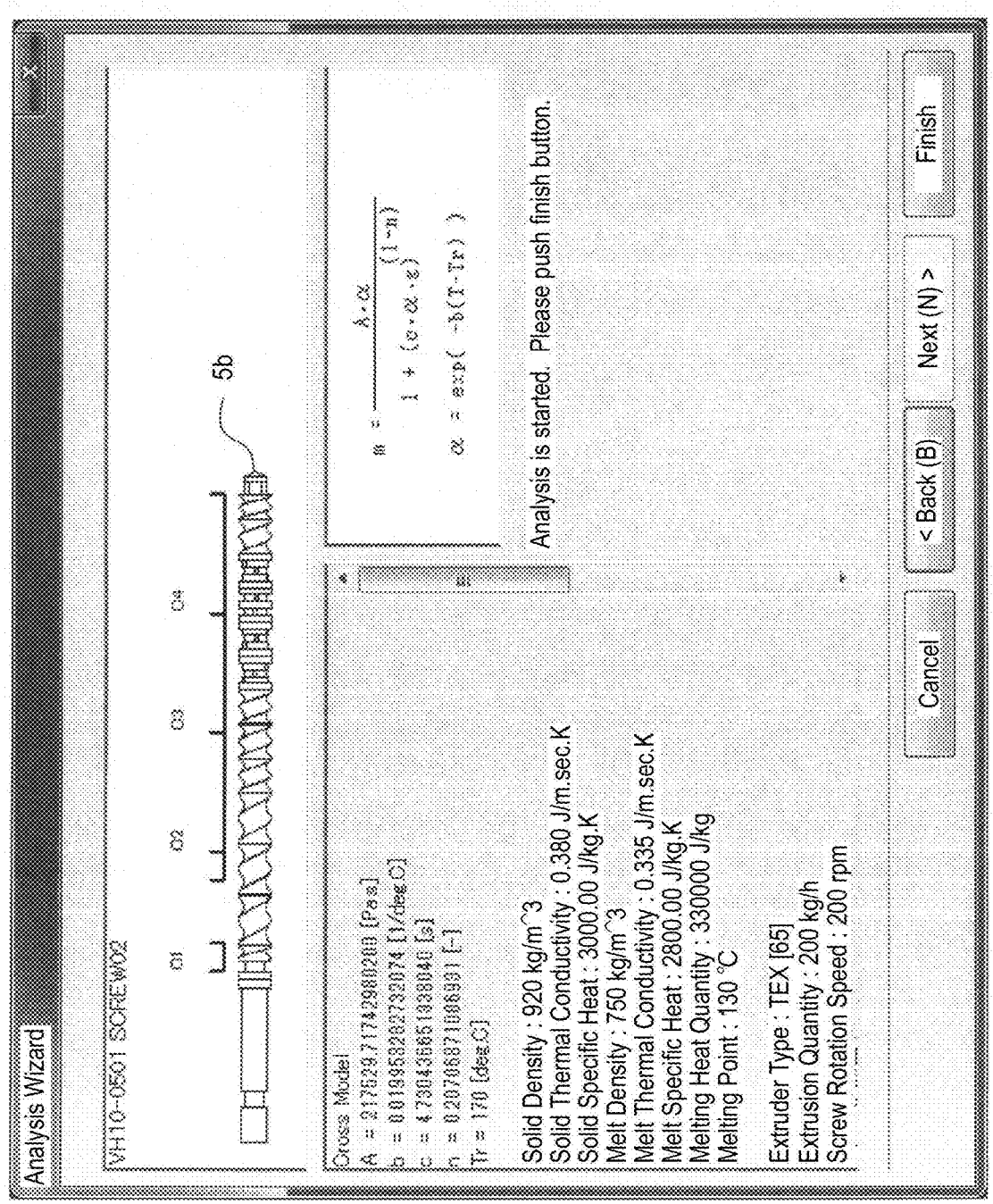
FIG. 9 is a diagram showing a confirmation screen of various kinds of setting parameters.

In a case that the operation conditions is inputted and the "Next" button is selected by a user, as shown in FIG. 9, the screen output unit 101 displays a confirmation screen of the various kinds of setting parameters having been set in the "Analysis Wizard" window, thus urging a user to confirm the parameters (S5).

Figure 10:
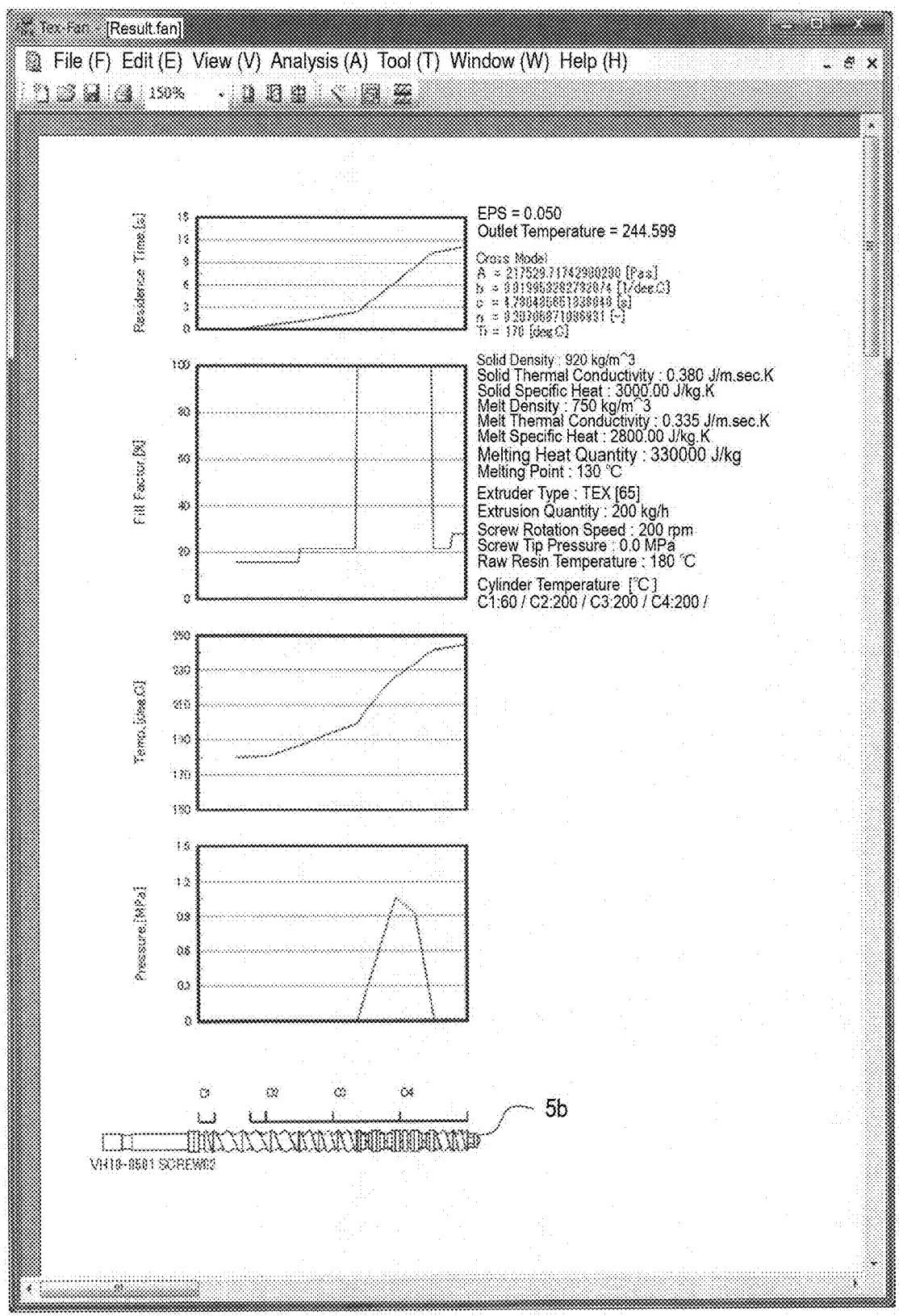
FIG. 10 is a diagram showing a display screen of analysis results of an 1D fluid-flow analysis processing.

In a case that a user finishes the confirmation and selects "Completion", the screen output unit 101 closes the "Analysis Wizard" window, and the 1D fluid-flow analysis processing is executed by the 1D analysis unit 102 and the determination processing unit 103 (S6). In the 1D fluid-flow analysis processing, the 1D fluid-flow analysis is executed based on the various kinds of setting parameters. After completion of this analysis processing, a display screen (Tex-Fan-[Result, fan]) showing analysis results of the 1D fluid-flow analysis processing is displayed as shown in FIG. 10. As shown in FIG. 10, in this embodiment, Residence Time, Fill Factor, Temp (raw resin temperature), Pressure (resin pressure) are outputted as the results of the 1D fluid-flow analysis processing. Each of the physical quantities corresponds to an average value of a cross-section at each corresponding position of the screw shape data 5b arranged below. That is, an abscissa of each of the graphs corresponds to the screw shape data 5b, and respective values in the abscissa of each of the graphs represent average values at the respective cross-sections orthogonal to the axial direction of the screw shape data. Details of the 1D fluid-flow analysis processing will be explained later.

Figure 11:
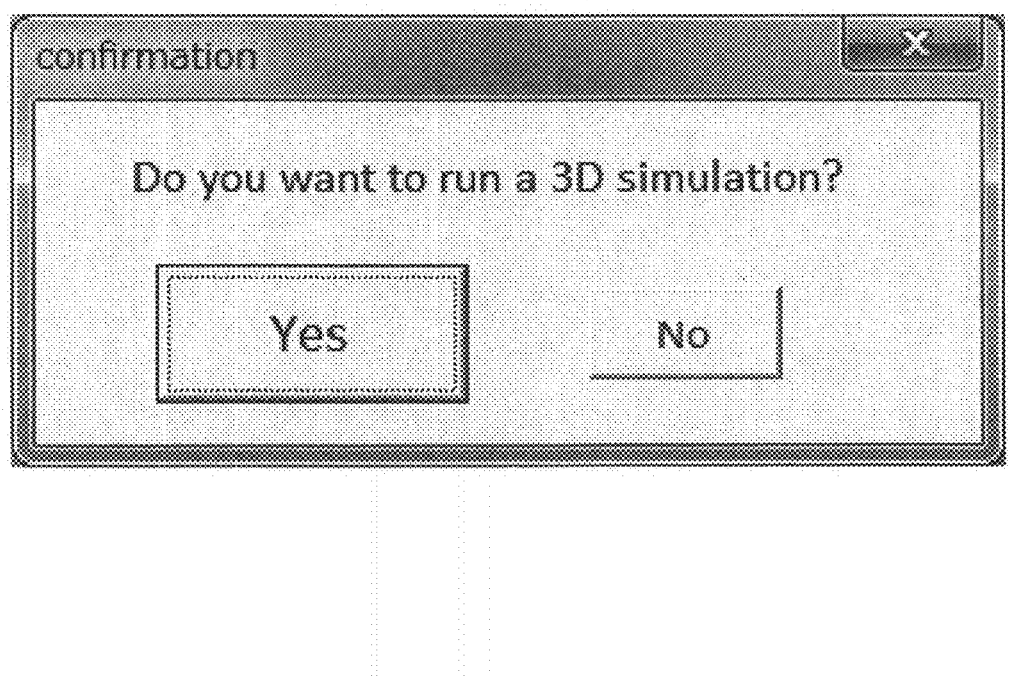
FIG. 11 is a diagram showing a presentation screen for asking whether or not processing proceeds to a 3D fluid-flow analysis processing.
Figure 12:
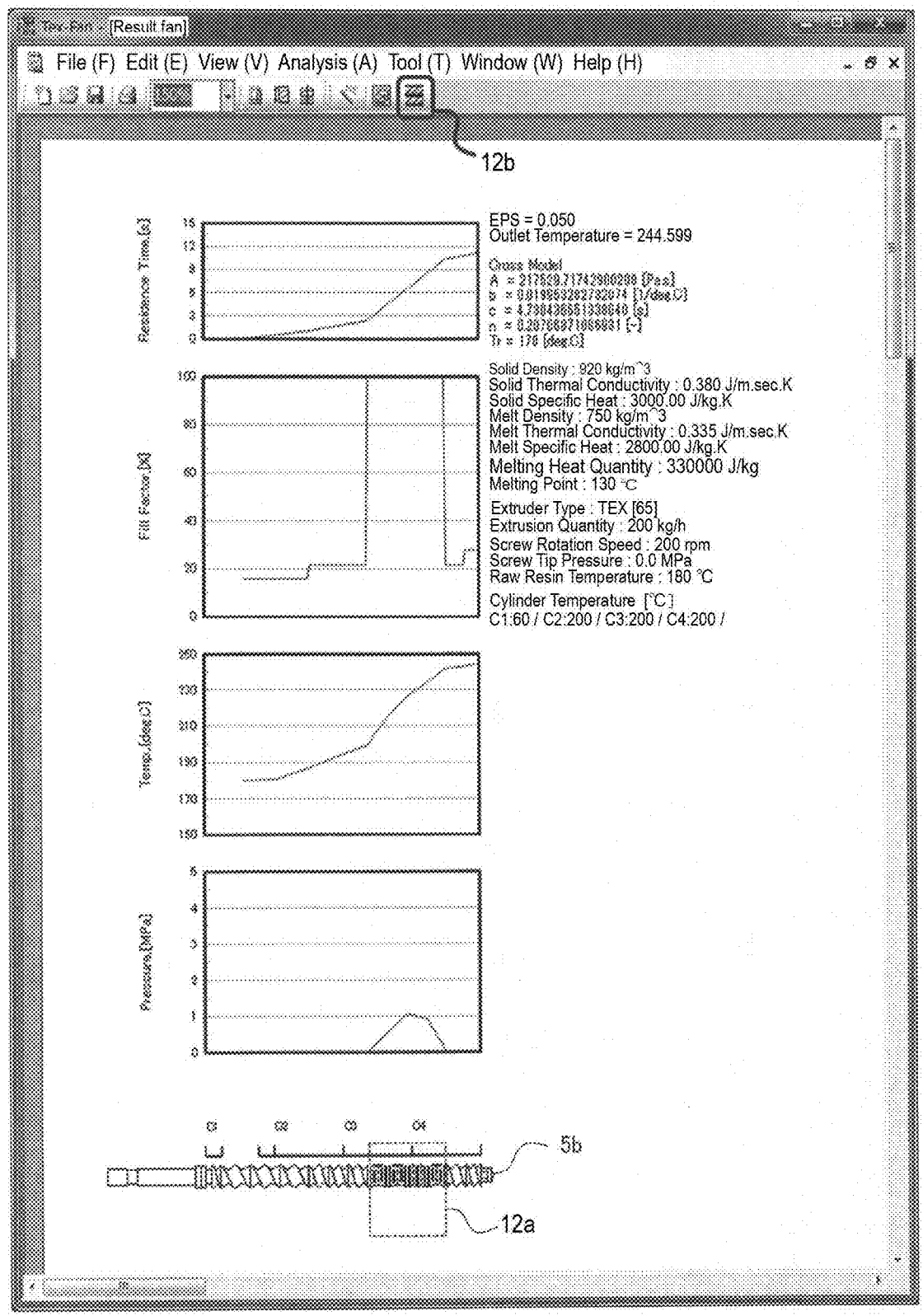
FIG. 12 is a diagram for explaining selection of a 3D fluid-flow analysis object area and execution of the 3D fluid-flow analysis processing, on the display screen of the analysis results of the 1D fluid-flow analysis processing.

After completion of the 1D fluid-flow analysis processing, as shown in FIG. 11, the screen output unit 101 displays a "Confirmation" window containing "Yes" and "No" buttons as another window, and further displays a presentation screen asking whether or not the processing proceeds to the 3D fluid-flow analysis processing, thus urging a user to select whether or not the 3D fluid-flow analysis processing is to be executed (S7). Incidentally, this "Confirmation" window is displayed in a state that the display screen of the analysis results of the 1D fluid-flow analysis processing is displayed. Thus, in a state that none of the "Yes" and "No" buttons are selected, scales and display magnifications of the respective graphs can be changed freely.

In a case that the "No" button is selected (S7, No), the processing proceeds to the configuration data receiving processing of step S2 in order to execute the 1D fluid-flow analysis processing again. Alternatively, without shifting to step S2, the "Confirmation" window may be closed while keeping the display of the display screen of the analysis results of the 1D fluid-flow analysis processing.

In contrast, in a case that the "Yes" button is selected (S7, Yes), the area selection unit 104 enables selection of an object area of the 3D fluid-flow analysis on the screw shape data 5b displayed on the display screen of the analysis results of the 1D fluid-flow analysis processing, and further enables execution of the 3D fluid-flow analysis processing in response to this selection, thus urging a user to perform this selection and the execution (S8). The 3D fluid-flow analysis object area is an area representing the arithmetic object field of the 3D fluid-flow analysis processing. This area is shown by a symbol 12a in FIG. 12. In this embodiment, the 3D fluid-flow analysis object area 12a can be selected and formed by dragging a part (or entirety) of the screw shape data using, for example, a mouse on the screw shape data 5b. In a case that the 3D fluid-flow analysis object area 12a is selected, the area selection unit 104 enables selection (clock)

of an icon button 12b provided at a tool bar on the display screen of the analysis results of the 1D fluid-flow analysis processing.

Figure 13:
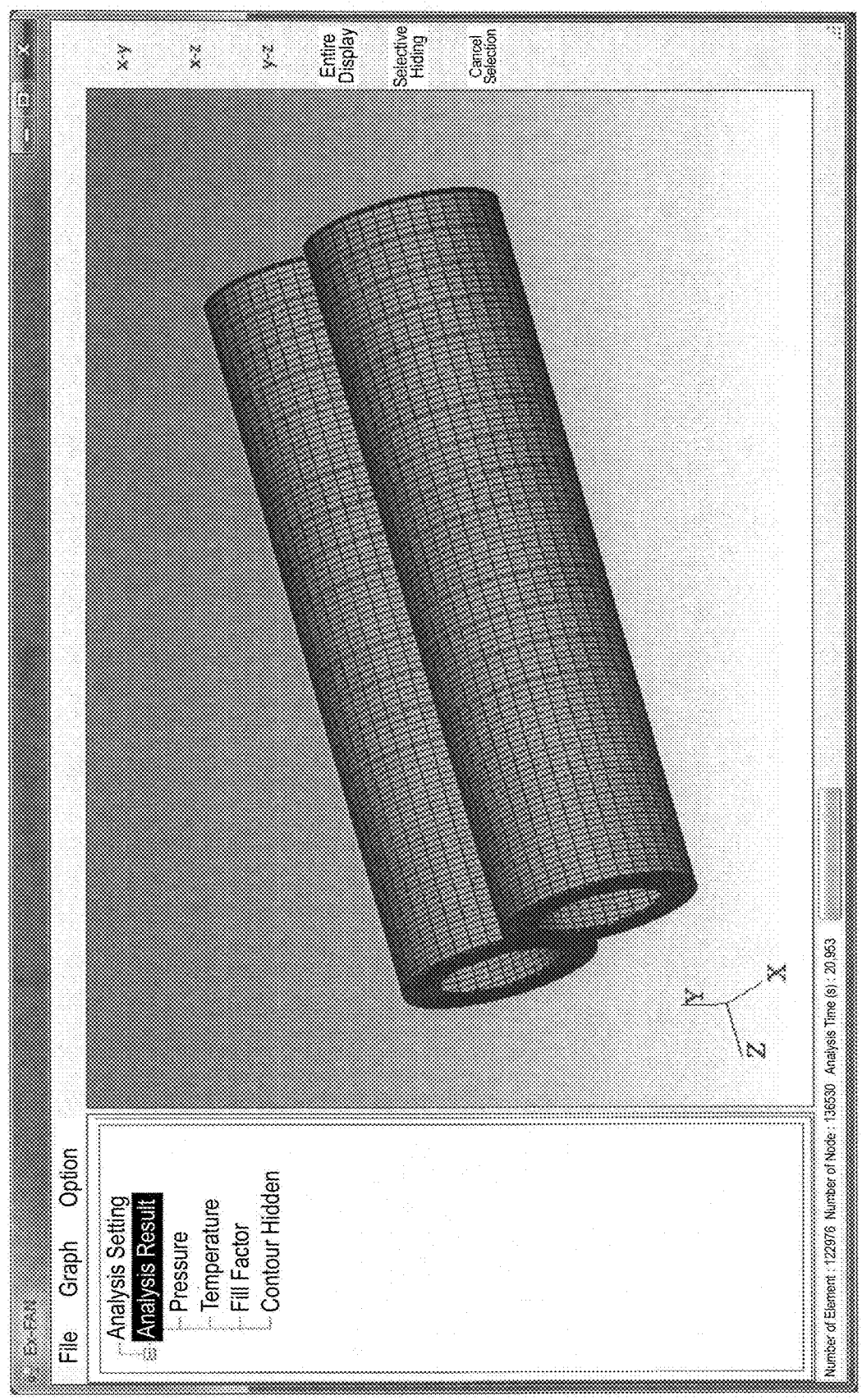
FIG. 13 is a diagram showing a display screen of element division data in an entirety of a flow path in analysis results of the 3D fluid-flow analysis processing.
Figure 14:
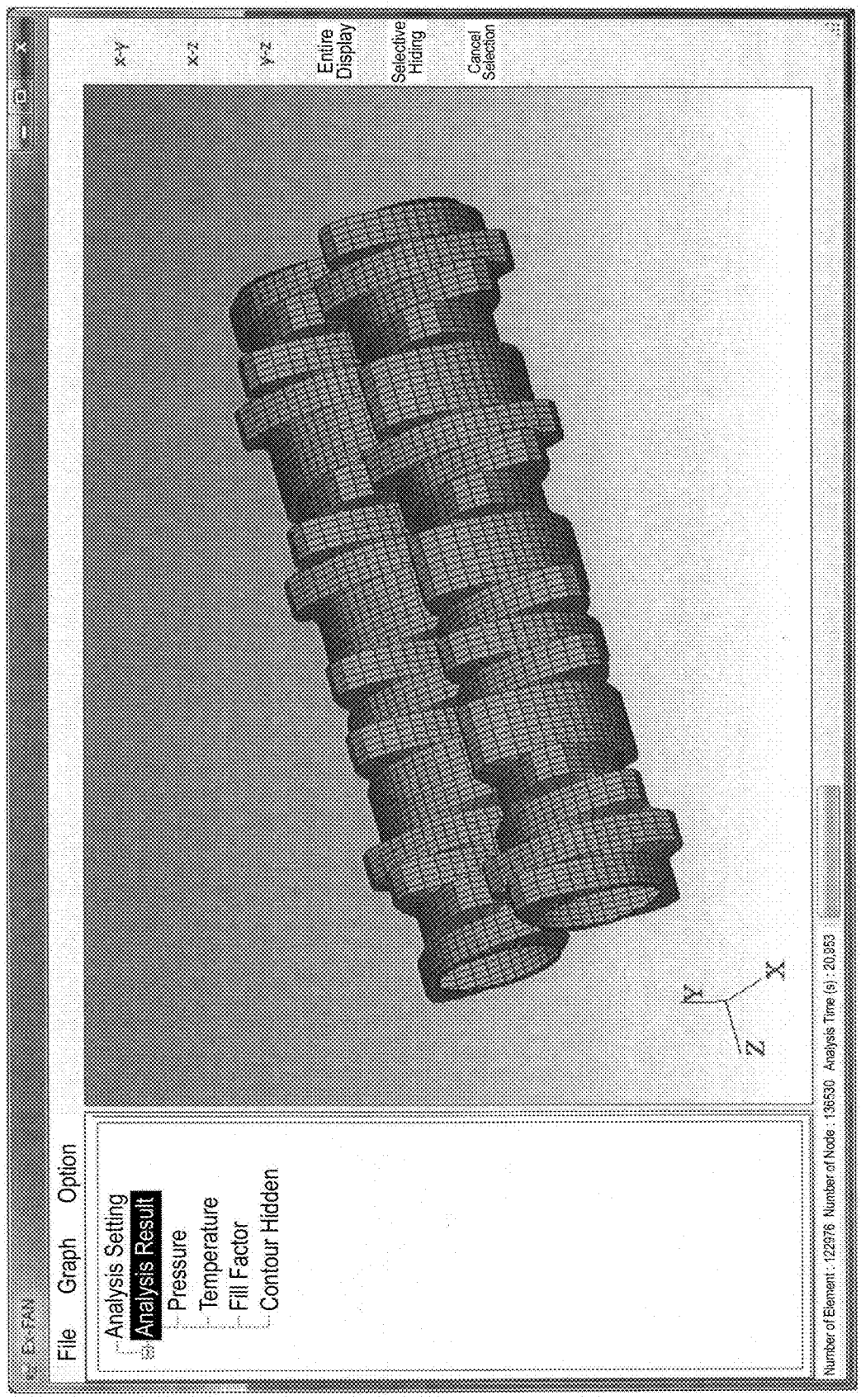
FIG. 14 is a diagram showing a display screen of element division data of a screw shape in the analysis results of the 3D fluid-flow analysis processing.

In a case that the icon button 12b is selected, the 3D analysis unit 105 executes the 3D fluid-flow analysis processing (S9), thus completing this flowchart. In the 3D fluid-flow analysis processing, the 3D fluid-flow analysis is executed based on the various kinds of setting parameters used in the 1D fluid-flow analysis processing and the analysis results of 1D fluid-flow analysis processing. After execution of this analysis, a window displaying new analysis results of the 3D fluid-flow analysis processing is displayed. This window can display, as 3D shapes, for example, element division data in an entirety of the flow path shown in FIG. 13, element division data of the screw shape shown in FIG. 14, pressure distribution data shown on a right lower side in a screen of FIG. 15, and resin temperature distribution data. In this state, both the window representing the analysis results of 1D fluid-flow analysis processing shown in FIG. 10 and the window representing the analysis results of the 3D fluid-flow analysis processing shown in FIGS. 13 and 14 are displayed. This is because, as the analysis processings is executed under the operation environment of the same software (coupled analysis program 20), both the analysis results can be linked simultaneously.

Figure 15:
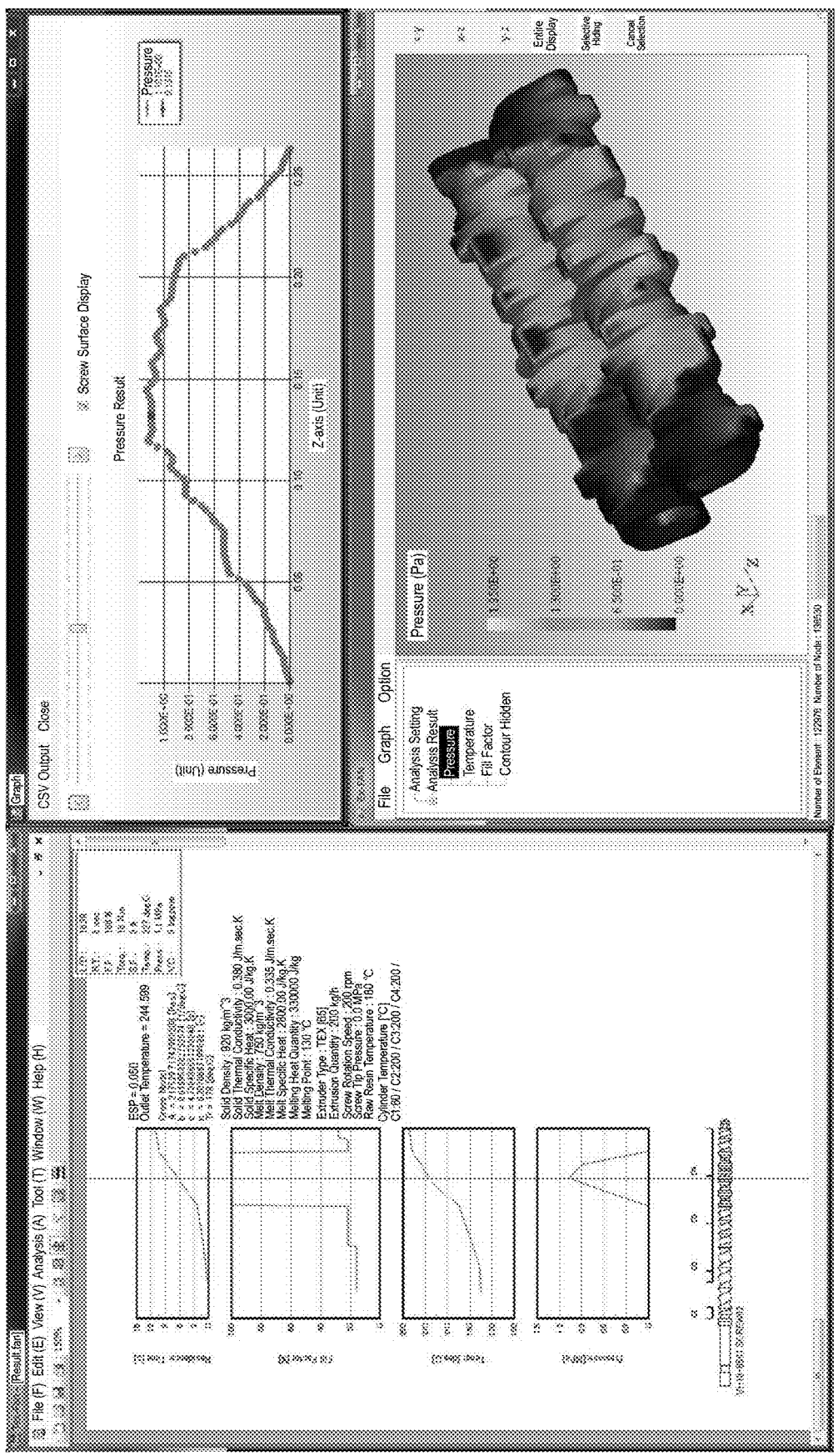
FIG. 15 is a diagram showing a display screen of the analysis results and pressure distribution data in both the 1D and 3D fluid-flow analysis processing.
Figure 16:
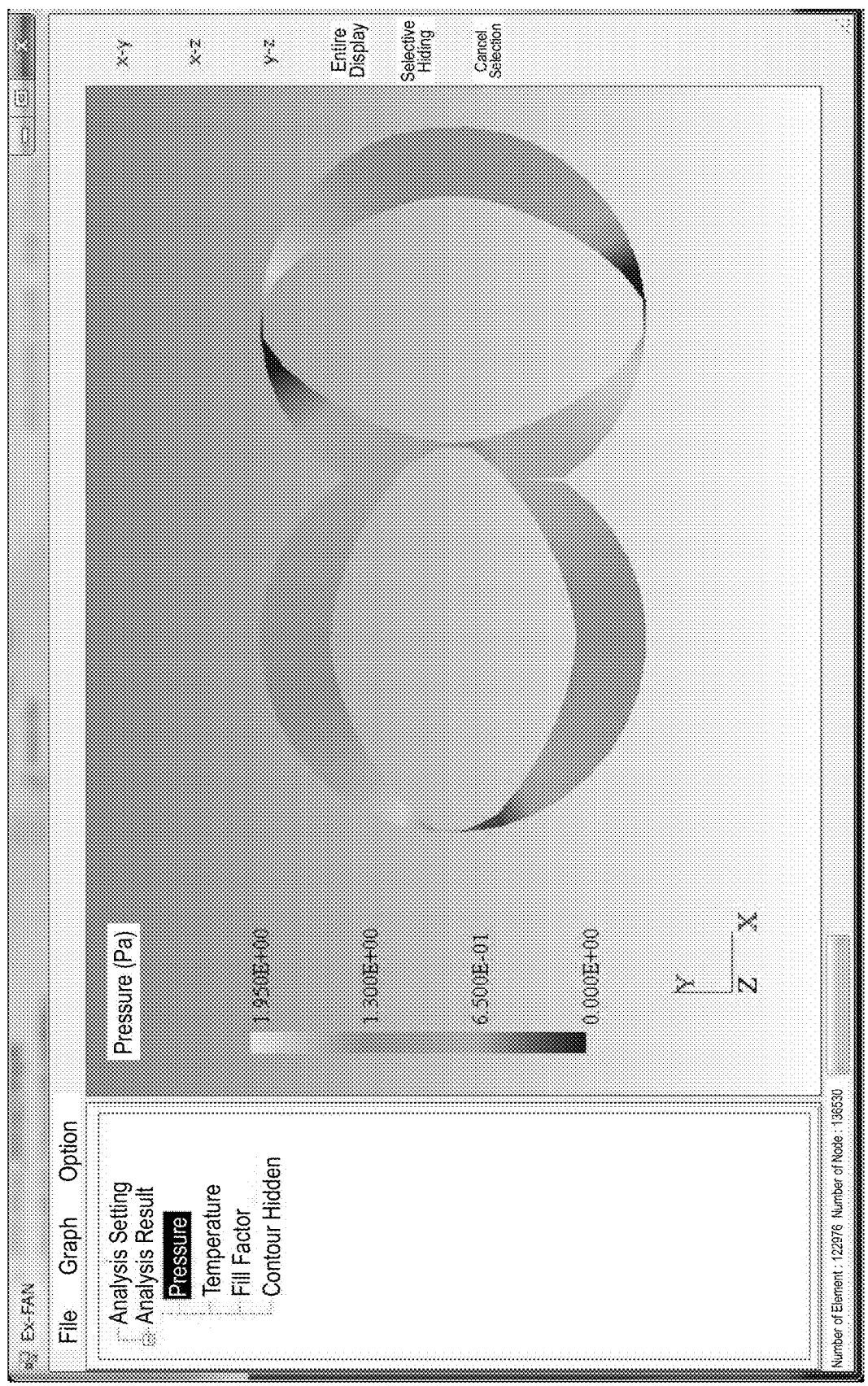
FIG. 16 is a diagram showing a display screen of a 2D pressure distribution diagram at a cross-section along an axial direction designated on the display screen shown in FIG. 15.

Thus, as shown in FIG. 15, by moving a slide bar 15a for designating a cross-section of the 3D fluid-flow analysis object area 12a in the left and right direction, a slide line15b arranged on the 1D fluid-flow analysis results located on the left side in FIG. 15 can be moved in the left and right direction in a linked manner. As respective corresponding cross-sections of both the 1D fluid-flow analysis results and the 3D fluid-flow analysis results can be displayed, it becomes possible to grasp positional information in the entire extruder and also evaluate detailed physical property distribution at the respective cross-sections. Further, the display screen representing the 3D fluid-flow analysis results shown in FIG. 15 (see FIGS. 13 and 14) can be switched into a display screen of a 2D distribution diagram at a screw cross section corresponding to a position of the slide bar 15a as shown in FIG. 16, according to a selection by a user (selection of a corresponding icon or the like). Thus, it also becomes possible to analyze detailed physical property distribution at the respective cross-sections based on the 1D fluid-flow analysis results.

(1D Fluid-flow Analysis Processing)

Next, the aforementioned 1D fluid-flow analysis processing will be explained. The 1D fluid-flow analysis processing according to the embodiment is an 1D fluid-flow analysis using the FAN method. In this embodiment, this analysis is performed using a technique disclosed in Japanese Patent No. 3,679,392 owned by the applicant of the present application. Incidentally, the technique of performing the 1D fluid-flow analysis processing is not limited to the FAN method but may be another optional method such as the finite element method or a boundary element method, so long as various kinds of physical quantities can be calculated in the arithmetic object field (flow path area) of the extruder. Hereinafter, the 1D fluid-flow analysis processing will be explained briefly.

Figure 17:
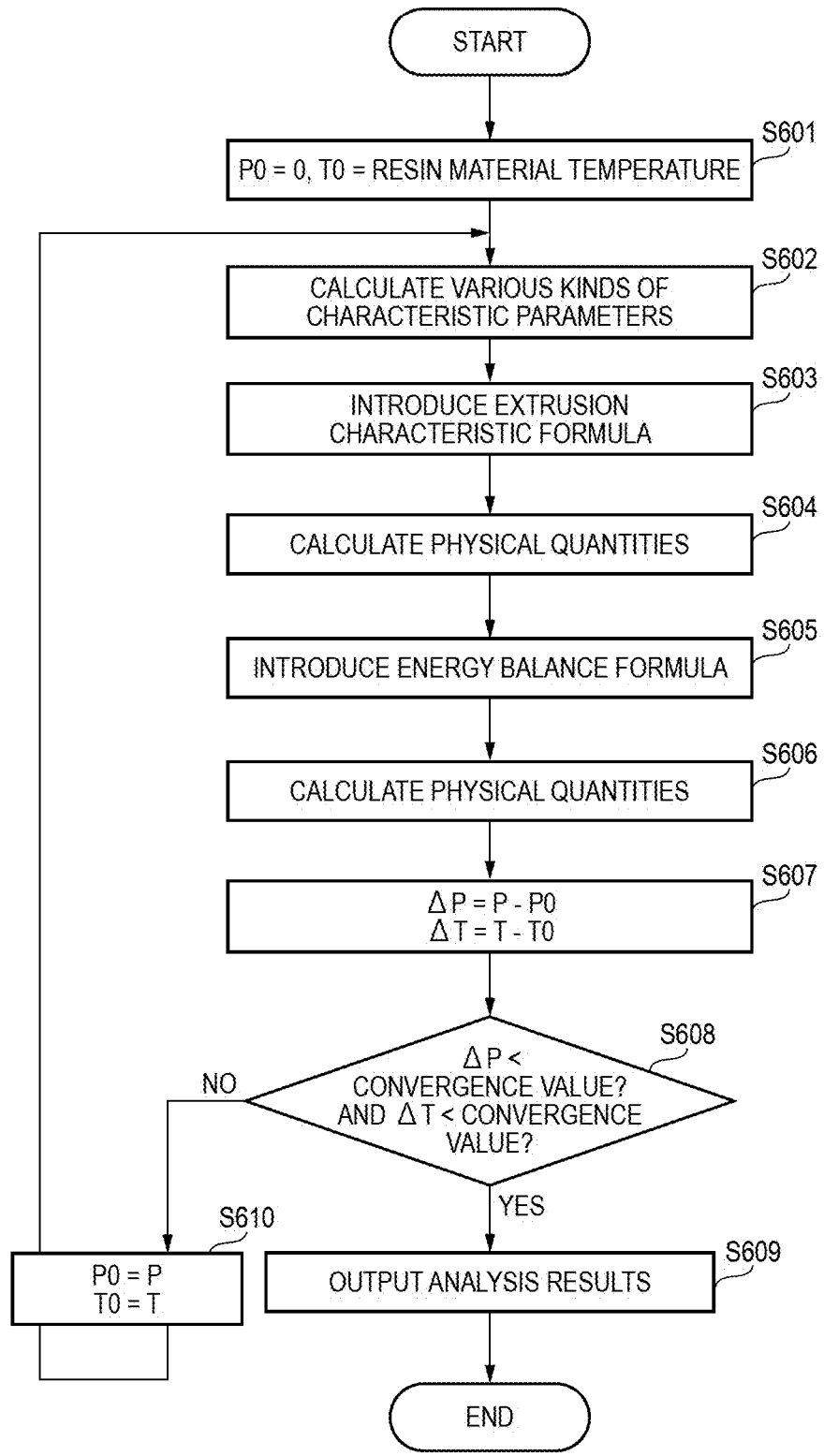
FIG. 17 is a flowchart showing the 1D fluid-flow analysis processing.

FIG. 17 is a flowchart showing the 1D fluid-flow analysis processing. As shown in FIG. 17, firstly the 1D analysis unit 102 initializes a pressure P0 and a raw resin temperature T0, specifically, sets P0=0 and T0=resin material temperature (S601). Then, the 1D analysis unit calculates extrusion characteristic parameters and viscous heat parameters based on the various kinds of setting parameters (S602). After the calculation of the characteristic parameters, the 1D analysis unit 102 introduces an extrusion characteristic formula (S603) and calculates pressures P, fill factors f and residence times t as the physical quantities based on the setting parameters and the characteristic parameters (S604). After this calculation, the 1D analysis unit introduces energy balance formulas (S605) and calculates calorific values and resin material temperatures T as the physical quantities based on the setting parameters and the characteristic parameters (S606). After this calculation, in order to determine convergence, the 1D analysis unit 102 calculates a pressure difference $\Delta P=P-P0$ and a temperature difference $\Delta T=T-T0$ at each corresponding position with respect to the entire flow path area of the extruder (area shown by the screw shape data 5b), thus obtaining the pressure difference $\Delta P$ and the temperature difference $\Delta T$ (S607).

After this calculation, the determination processing unit 103 determines whether or not the pressure differences $\Delta P$ and the temperature differences $\Delta T$ in the entire flow path area of the extruder are lower than respective predetermined convergence values (S608). In a case that the pressure difference $\Delta P$ and the temperature difference $\Delta T$ in the entire flow path area of the extruder are determined to be lower than the predetermined convergence values, respectively (S608, Yes), the image output unit outputs the analysis results. For example, the image output unit outputs and displays the physical quantities such as the fill factor f, pressure (resin material pressure) P, residence time t, resin material temperature T, in the graph and numerical value formats as shown in FIG. 10 (S609), thus completing this flowchart. In contrast, in a case that both the pressure difference $\Delta P$ and the temperature difference $\Delta T$ in the entire flow path area of the extruder are determined not to be lower than the respective predetermined convergence values (S608, No), the determination processing unit 103 sets P0=P and T0=T (S610), and the processing shifts to the calculating processing of various kinds of characteristic parameters in step S602 again.

The aforementioned calculating method of characteristic parameters, the extrusion characteristic formula, the energy balance formulas, the calculation method of the physical quantities using the formulas, etc. are same as those disclosed in Japanese Patent No. 3,679,392, and hence detailed explanation thereof is omitted.

(3D Fluid-flow Analysis Processing)

Next, the aforementioned 3D fluid-flow analysis processing will be explained. The 3D fluid-flow analysis processing according to the embodiment is a 3D fluid-flow analysis using the FEM. Incidentally, the technique of performing the 3D fluid-flow analysis processing is not limited to the FEM but may be another optional method such as the finite volume method or the finite difference method, so long as various kinds of physical quantities can be calculated in the 3D fluid-flow analysis object area 12a. Hereinafter, the 3D fluid-flow analysis processing will be explained in detail with reference to FIG. 18.

Figure 18:
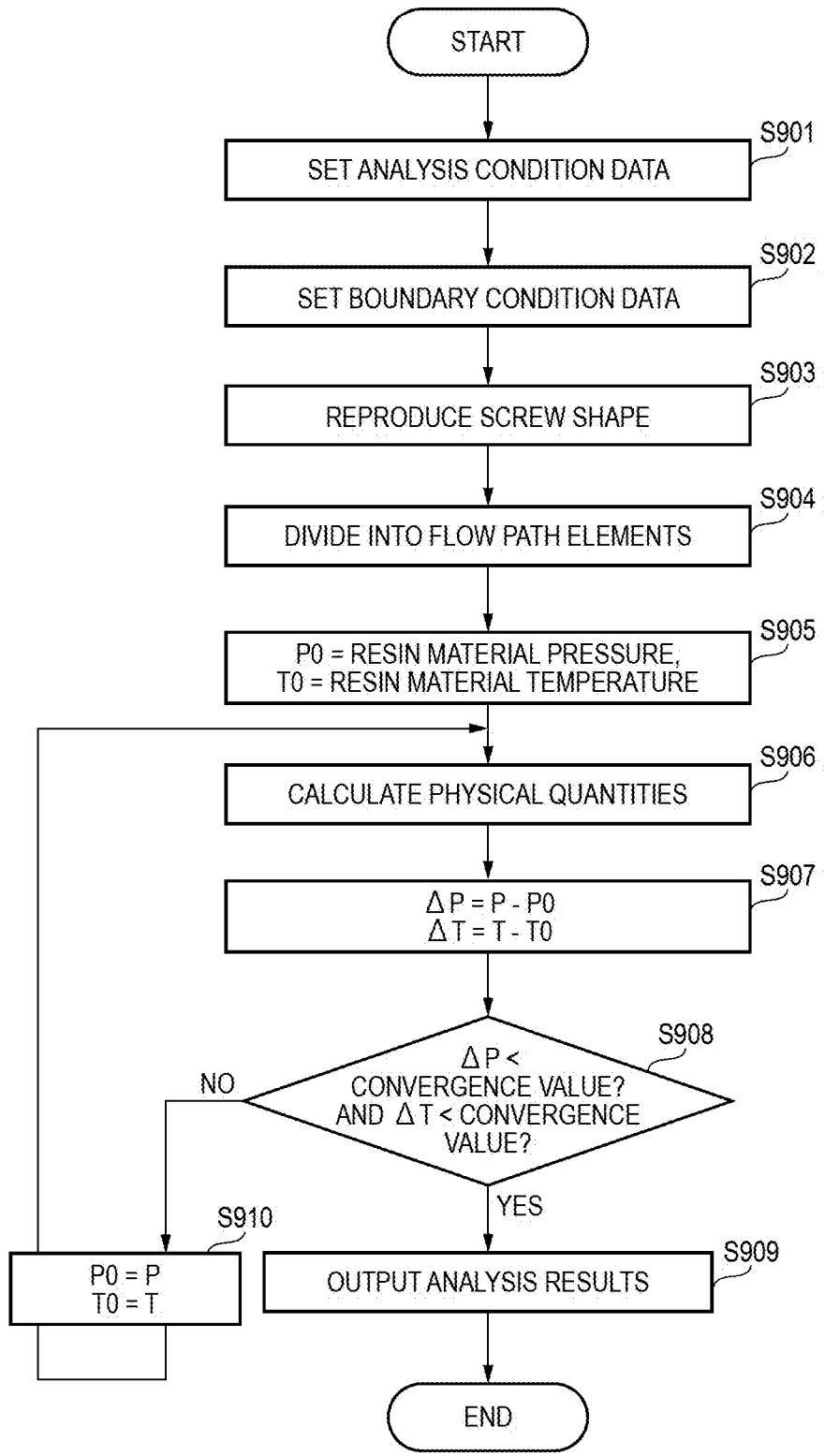
FIG. 18 is a flowchart showing the 3D fluid-flow analysis processing.

FIG. 18 is flowchart showing the 3D fluid-flow analysis processing. As shown in FIG. 18, firstly the 3D analysis unit 105 obtains the various kinds of the setting parameters like the 1D fluid-flow analysis processing and sets as analysis condition parameters (S901). Further, the 3D analysis unit extracts and sets boundary condition data from the analysis results of the 1D fluid-flow analysis processing (S902). In this embodiment, the boundary condition data is a resin material temperature T of a boundary position located at an upstream side end portion of the 3D fluid-flow analysis object area 12a and a resin material pressure P of a boundary position located at a downstream side end portion of this area. The analysis results of the 1D fluid-flow analysis processing is outputted as the average values at respective cross-sections. Thus, in the 3D fluid-flow analysis processing according to the embodiment, the analysis results of the 1D fluid-flow analysis processing is uniformly given to all nodes at respective cross-sections of the most upstream and downstream portions in the 3D fluid-flow analysis object area 12a. Thereby, also in the analysis results of the 3D fluid-flow analysis processing, each of the resin material temperature T at the cross-section of the most upstream portion and the resin material pressure P at the cross-section of the most downstream portion in the 3D fluid-flow analysis object area 12a is outputted as uniform data. However, node data at a cross-section on the upstream or downstream side portion than the cross-sections by one node within the 3D fluid-flow analysis object area 12a has a distribution. Thus, quite suitable analysis can be performed by this setting of the voluntary condition data.

After setting the voluntary condition data, the 3D analysis unit 105 reproduces the screw shape of the 3D fluid-flow analysis object area 12a as a 3D image (S903). This reproducing of the screw shape will be explained briefly. Like the general resin fluid-flow analysis, an inflow rate (a set extrusion quantity) or a flow velocity of the fluid (resin material) is given to the most upstream portion (fluid inflow portion) of the 3D fluid-flow analysis object area 12a, and the resin material pressure P of the boundary condition data is set at an optimal portion (in general, an outflow portion) within this area. Incidentally, in a case of performing thermal analysis, a heat transfer quantity from the outside is set. The screw shape is concretely reproduced based on the setting values. As the concrete reproducing method of the screw shape is generally known, the detailed explanation thereof is omitted.

After reproducing the screw shape, the 3D analysis unit 105 divides the flow path area of the 3D fluid-flow analysis object area 12a as the arithmetic object field into prescribed lattice elements of a 3D shape (S904). In a view point of a calculation time and calculation accuracy, the shape of this divided lattice elements is preferably a tetrahedron and, more preferably, a hexahedron. After the division, the 3D analysis unit 105 initializes the pressure P0 and the raw resin temperature T0 in order to calculate the physical quantities to be given to respective calculation points (respective nodes of the lattice elements). Specifically, the 3D analysis unit 105 sets P0=a resin material pressure of the boundary condition data and T0=a resin material temperature of the boundary condition data (S905), and calculates physical quantities such as a pressure (resin material pressure) P, a velocity v, a residence time t and a resin material temperature T for each of all the calculation points (S906). Specifically, the 3D analysis unit 105 calculates a pressure P, a velocity v, a residence time t for the each calculation point using the law of conservation of mass and the law of conservation of momentum, and calculates a resin material temperature T for the each calculation point using the equation of energy. As the calculation methods are generally known, the detailed explanation thereof is omitted. Incidentally, in a case of not performing the temperature analysis, the calculation of the resin material temperature T may be omitted.

As an example, the method of calculating the pressure P and the velocity v will be explained briefly. That is, the following expressions (1) and (2) are applied to each of the calculation points to thereby calculate the pressure P and the velocity v fort each of the calculation points.

$$\nabla v = 0 \quad (1)$$

$$-\nabla P + \nabla(2\eta D) = 0 \quad (2)$$

In the expressions, v represents a velocity vector, P a pressure, $\eta$ a shear viscosity, and D a strain rate tensor. The shear viscosity $\eta$ is calculated in a manner that a shear velocity, determined by rotation of the screw, is obtained using the following expression (3) based on a screw rotation speed N and a cylinder diameter $D_B$ each set in advance, and then the shear viscosity $\eta$ is calculated from the viscosity model formula using the shear velocity.

$$\dot{\gamma} = \frac{\pi DN}{H} \quad (3)$$

In this expression (3), $D_B$ represents the cylinder diameter, H the groove depth and N the screw rotation speed. The shear viscosity $\eta$ is preferably calculated using a model formula of non-Newtonian fluid with respect to the resin material. Although various kinds of non-Newtonian model formulas have been proposed, the shear viscosity can be obtained from the following expression (4) in a case of using, for example, the power-law model as a representative one of the non-Newtonian model formulas.

$$\eta = m\dot{\gamma}^{(n-1)} \quad (4)$$

In this expression (4), $\eta$ represents the shear viscosity and each of m and n represents the physical property parameter. In a case of developing each of the expressions (1) and (2) in 3D components, the expression (1) remains as a single expression. However, as the velocity v is developed into (vx, vy, vz), the expression (2) is also developed into three expressions relating to the x, y and z components, respectively. In a case of substituting the obtained shear viscosity $\eta$ for $\eta$ in the expression (2), uncertain parameters of the expressions (1) and (2) become four, that is, the pressure P and the velocities (vx, vy, vz). The pressure P and the velocity v can be obtained as a solution by solving a simultaneous equation of the four expressions (1) to (4). Incidentally, expressions for obtaining the physical quantities are not limited to the expressions but may be optional ones so long as they can obtain physical quantities of the respective calculation points.

After calculating the physical quantities, the 3D analysis unit 105 calculates the pressure difference $\Delta P = P - P0$ and the temperature difference $\Delta T = T - T0$ with respect to each of the calculation points of the 3D fluid-flow analysis object area 12a in order to determine convergence, thus obtaining the pressure differences $\Delta P$ and the temperature differences $\Delta T$ (S907). Incidentally, P and T in this case are the resin material pressure P and the resin material temperature T obtained by the physical quantity calculation processing in step S906.

After this calculation, the determination processing unit 103 determines whether or not each of the pressure differences $\Delta P$ and the temperature differences $\Delta T$ are lower than respective predetermined convergence values (S908). In a case that the pressure difference $\Delta P$ and the temperature difference $\Delta T$ are determined to be lower than the predetermined convergence values, respectively (S908, Yes), the image output unit outputs the analysis results. For example, the image output unit outputs and displays the pressure P, as the physical quantity, in the form of a graph as shown on the upper right side in the screen of FIG. 15 and also in the form of pressure distribution image of 3D format on the lower right side as shown in this screen (S909), thus completing this flowchart. In contrast, in a case that both the pressure difference ΔP and the temperature difference ΔT are determined not to be lower than the respective predetermined convergence values (S908, No), the determination processing unit 103 sets P0=P and T0=T (S910), and the processing shifts to the physical quantity calculating processing in step S906 again.

According to this embodiment, the setting parameters set upon the 1D fluid-flow analysis processing as a low-dimensional fluid-flow analysis can be automatically used for the 3D fluid-flow analysis processing as a high-dimensional fluid-flow analysis. Further, the boundary conditions can also be automatically extracted from the analysis results of the 1D fluid-flow analysis processing only by selecting the 3D fluid-flow analysis object area 12a. In this manner, the low-dimensional fluid-flow analysis and the high-dimensional fluid-flow analysis can be realized quite efficiently as compared with a case of manually performing the setting and calculation. Further, as the analysis results of both the low and high-dimensional fluid-flow analyses can be displayed and selected in a linked manner, a user can more deeply understand and easily evaluate the analysis results.

Further, like this embodiment, if the divided number of the lattice elements (mesh) is determined as a rule in advance upon execution of the 3D fluid-flow analysis processing, it becomes possible to eliminate the inputting and setting of the analysis conditions, except for the selection of the 3D fluid-flow analysis object area 12a. Thus, most of the data necessary for the analysis can be automatically transferred and set in the coupled analysis program 20. In the general twin-screw extruder simulation using the FAN method software as the 1D fluid-flow analysis of the related art, a time required from the condition setting to the analysis completion is about five minutes for each condition. Like this embodiment, if the 3D fluid-flow analysis is performed in the automatically linked manner, this analysis can be performed with almost additional ten minutes in a case of the steady analysis. Also in a case of using this embodiment for the examination analysis of optimization of the actual molding process, as the analysis can be performed within expended hours of a sufficient practical range, a cost depending on the work hours can be reduced remarkably.

Further, as it is also possible to perform only the 1D fluid-flow analysis independently, if a user determines that the 3D fluid-flow analysis is not necessary after the 1D fluid-flow analysis, execution of the 3D fluid-flow analysis processing can be avoided. Thus, formerly, a user can execute several examples of the 1D fluid-flow analysis processing, and then obtain the entire screw configuration or optimize the operation conditions satisfying the required values. Upon completion of this optimization, 3D fluid-flow analysis may be executed. Thereby, the kneading efficiency can be evaluated more in detail.

In this embodiment, although a user is urged to perform the input in the various kinds of screens, thereby obtaining the setting parameters thus inputted, the invention is not limited thereto. Alternatively, at the time of performing the analysis, the 1D analysis unit 102 and the 3D analysis unit 105 may suitably obtain various kinds of parameters stored in the HDD 15 in advance.

(Applied Example)

In the aforementioned embodiment, the 3D fluid-flow analysis object area 12a is selected in a case that the execution of the 3D fluid-flow analysis processing is selected. That is, after completion of the 1D fluid-flow analysis processing, this analysis results is evaluated, then the 3D fluid-flow analysis object area 12a is selected and the 3D fluid-flow analysis processing is executed. In this manner, the 3D fluid-flow analysis processing is executed after completion of the 1D fluid-flow analysis processing. However, as both the analysis processing can be executed by the same software (the coupled analysis program 20), the 1D fluid-flow analysis processing and the 3D fluid-flow analysis processing may be executed serially (the 3D fluid-flow analysis processing may be executed automatically after completion of the 1D fluid-flow analysis processing) by setting the 3D fluid-flow analysis object area 12a in advance before executing the 1D fluid-flow analysis processing.

Figure 19:
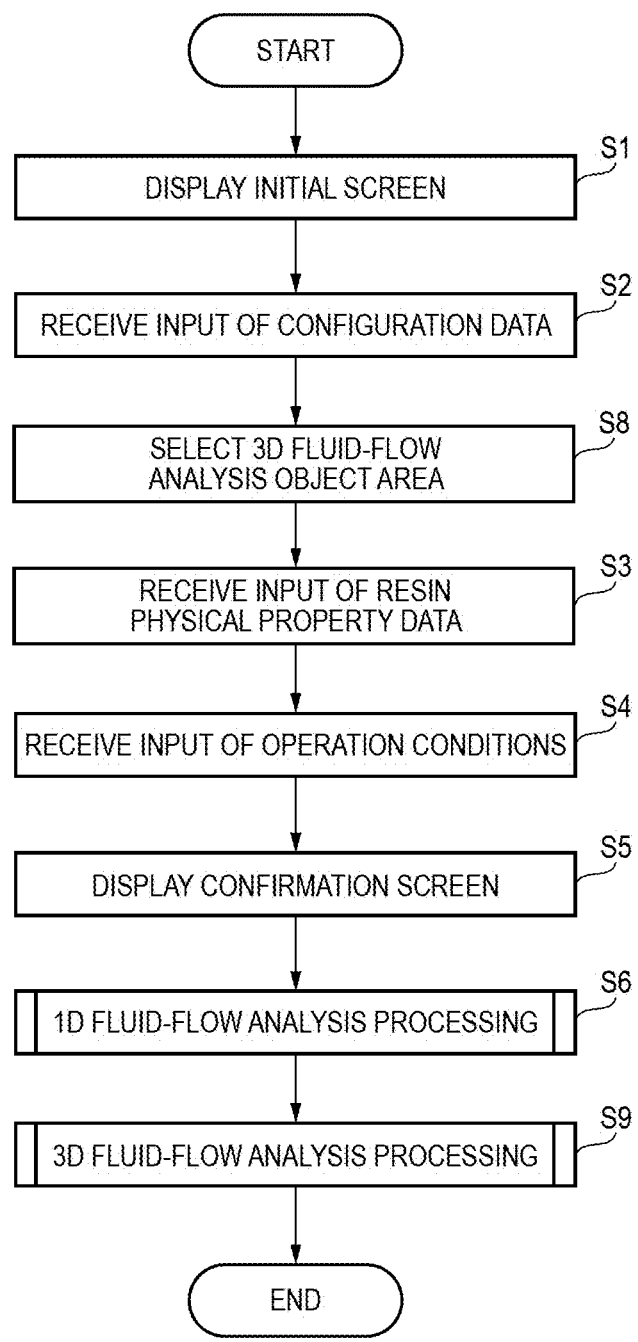
FIG. 19 is a flowchart showing the second 1D-3D coupled analysis processing.

FIG. 19 is a flowchart showing the second 1D-3D coupled analysis processing in which the 1D fluid-flow analysis processing and the 3D fluid-flow analysis processing is executed serially. Incidentally, in FIG. 19, processings identical to those shown in FIG. 3 are referred to by the common symbols, with explanation thereof being omitted. As shown in FIG. 19, in this case, the selection processing of the 3D fluid-flow analysis object area 12a in step S8 is performed after the configuration data input receiving processing of step S2. Thereafter, the resin physical property data input receiving processing of step S3 is executed. Further in this case, in the analysis result output processing in step S909 contained in the 3D fluid-flow analysis processing in step S9, both the 1D fluid-flow analysis results and the 3D fluid-flow analysis results is outputted (displayed) simultaneously as shown in FIG. 14.

As shown in FIG. 19, also in the second 1D-3D coupled analysis processing, the setting item necessary for executing the 3D fluid-flow analysis processing is only the selection and extraction of the 3D fluid-flow analysis object area 12a based on the entire screw configuration of the extruder set before the execution of the 1D fluid-flow analysis processing. Further, like the 1D-3D coupled analysis processing shown in FIG. 3, the analysis condition parameters are shared between the 1D and 3D fluid-flow analysis processing and the boundary condition data necessary for the 3D fluid-flow analysis processing is automatically extracted from the analysis results of the 1D fluid-flow analysis processing.

As described above, in a case of executing the second 1D-3D coupled analysis processing, all the condition setting necessary for executing the 3D fluid-flow analysis processing is completed before the execution of the 1D fluid-flow analysis processing, and thus the 3D fluid-flow analysis processing is automatically executed after completion of the 1D fluid-flow analysis processing. Thus, an arithmetic time necessary for the coupled analysis can be reduced remarkably. As a result, in a case of performing evaluation and verification of the extrusion molding process already configured or performing a scale-up analysis at a time of changing a size of the extruder, physical property verification of the entire extruder and local verification of the kneading efficiency can be performed efficiently. Incidentally, before the execution of the 1D-3D coupled analysis processing, a command, for making a user select one of the 1D-3D coupled analysis processing shown in FIG. 3 and the second 1D-3D coupled analysis processing shown in FIG. 19, may be set, for example, on the start screen. Thereby, an arithmetic operation according to an object of the coupled analysis can be selectively executed.

This invention can be implemented in various modes without departing from the gist and main feature of the invention. Thus, the aforementioned embodiment merely shows examples in all respects and should not be interpreted narrowly. A scope of this invention is shown in claims and not limited to the descriptions of the specification. Further, all modifications, various improvements, replacements and reforms belonging to an equivalent range of the claims are all within a range of this invention.

Figure 4:
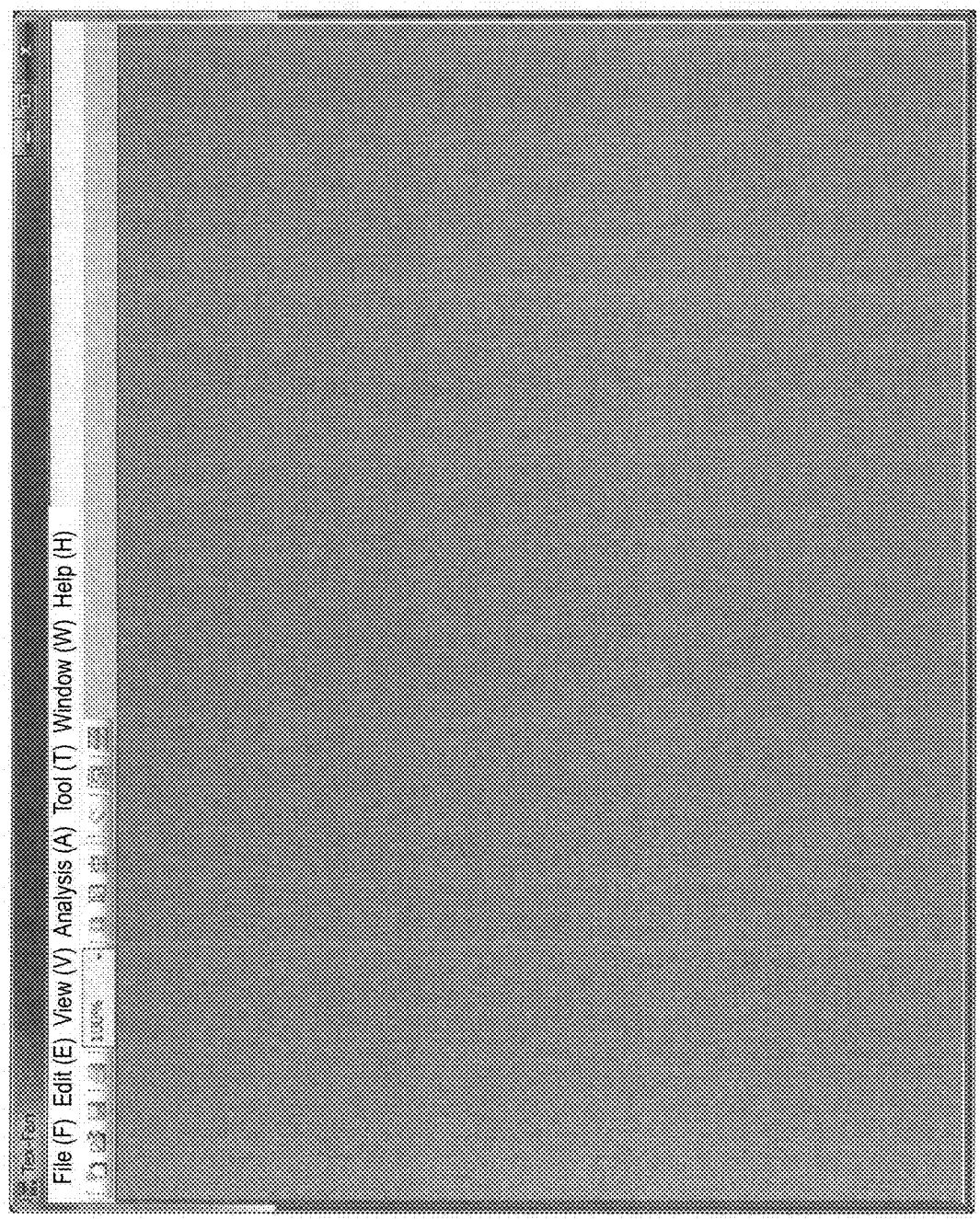
FIG. 4 is a diagram showing a start screen of a coupled analysis program.
Figure 20:
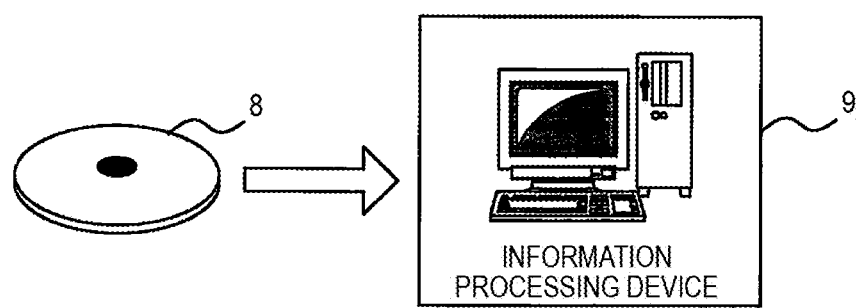
FIG. 20 is a diagram showing a case that the coupled analysis program is applied to an information processing device.

The coupled analysis program 20 described in the embodiment may be stored in a portable storage medium 8 readable by a computer, as shown in FIG. 20. In this case, an information processing device 9 can realize the functions described above by reading the storage medium 8. For example, in a case that the information processing device 9 reads the coupled analysis program 20, an icon for starting this program is displayed on the display unit 14. Then, if a user selects this icon, the start screen as shown in FIG. 4 is displayed. The storage medium 8 may be an optional medium readable by a computer such as an optical disc (CD-ROM, DVD disc or the like), a magnetic disc (hard disc drive or the like), a flash memory, an IC card, or a medium transmittable via a network.

Incidentally, a simulation apparatus described in the claims is, for example, the extruder simulation apparatus 10 according the embodiment. A simulation method described in the claims is, for example, the 1D-3D coupled analysis processing. A simulation program is, for example, the coupled analysis program 20. A low-dimensional analysis unit is, for example, the 1D analysis unit 102 and the determination processing unit 103. A selection receiving unit is, for example, the area selection unit 104. A physical quantity extraction unit is, for example, the 3D analysis unit 105. A high-dimensional analysis unit is, for example, the determination processing unit 103 and the 3D analysis unit 105. A data display unit and a display device are, for example, the screen output unit 101 and the display unit 14, respectively. A slide bar is, for example, the slide bar 15a.

What is claimed is:

1. A simulation apparatus for performing a fluid-flow analysis of material and for displaying user interface (GUI), the simulation apparatus comprising:
    a display configured to display, on the GUI, shape data showing a screw shape relating to an arithmetic object field of a kneading device;
    a selection receiving device;
    a processor; and
    a memory storing instructions that, when executed by the processor, cause the simulation apparatus to perform:
    a low-dimensional fluid-flow analysis of the material in the arithmetic object field based on setting information, the setting information including:
        physical property of the material; and
        configuration data and an operation condition of the kneading device for kneading the material;
    receiving, after or before performing the low-dimensional fluid-flow analysis, selection of an object area as an object of a high-dimensional fluid-flow analysis in the arithmetic object field through the selection receiving device, wherein the selection receiving device obtains an area selected on the shape data displayed on the GUI, as the object area;
    extracting physical quantities of the material relating to the object area, from among at least two physical quantities obtained from a result of the low-dimensional fluid-flow analysis; and
    a high-dimensional fluid-flow analysis of the material in the object area, based on the extracted physical quantities and the setting information, wherein at least two of the extracted physical quantities are set as boundary conditions for the high-dimensional fluid-flow analysis,
    wherein the display is further configured to display, on the GUI, an analysis result of the low-dimensional fluid-flow analysis and an analysis result of the high-dimensional fluid-flow analysis, and
    wherein, after performing the high-dimensional fluid-flow analysis, in response to receiving a selection of a position on the shape data according to an operation of a user, the display is further configured to display, on the GUI, the analysis result of the low-dimensional fluid-flow analysis of a section in the arithmetic object field, corresponding to the selected position on the shape data, correspondingly with the analysis result of the high-dimensional fluid-flow analysis.

2. The simulation apparatus according to claim 1,
    wherein the low-dimensional analysis calculates at least a temperature and a pressure of the material as the analysis result of the low-dimensional fluid-flow analysis, and
    wherein the physical quantities of the material relating to the selected object area is a temperature of the material at a boundary position located at an upstream side end portion of the object area, and a pressure of the material at a boundary position located at a downstream side end portion of the object area.

3. The simulation apparatus according to claim 1,
    wherein the low-dimensional analysis is an one-dimensional analysis using a FAN method, and
    wherein the high-dimensional analysis is a three-dimensional analysis using a lattice element method.

4. The simulation apparatus according to claim 1,
    wherein the display is further configured to display, on the GUI, a slide bar which is movable on the shape data according to the operation of the user to select the position on the shape data where the slide bar is placed.

5. A simulating method executed by a simulation apparatus for performing a fluid-flow analysis of material and for displaying a graphical user interface (GUI), the method comprising:
    displaying, on the GUI, shape data showing a screw shape relating to an arithmetic object field of a kneading device;
    performing a low-dimensional fluid-flow analysis of the material in the arithmetic object field, based on setting information, the setting information including:
        physical property of the material; and
        configuration data and an operation condition of the kneading device for kneading the material;
    receiving, after or before the performing of the low-dimensional fluid-flow analysis, selection of an object area as an object of a high-dimensional fluid-flow analysis in the arithmetic object field, the selection of the object area being an area selected on the shape data displayed on the GUI;
    extracting physical quantities of the material relating to the object area, from among at least two physical quantities obtained from a result of the low-dimensional fluid-flow analysis;
    performing a high-dimensional fluid-flow analysis of the material in the object area, based on the extracted physical quantities and the setting information, wherein at least two of the extracted physical quantities are set as boundary conditions for the high-dimensional fluid-flow analysis; and
    displaying, on the GUI, an analysis result of the low-dimensional fluid-flow analysis and an analysis result of the high-dimensional fluid-flow analysis, wherein after the performing of the high-dimensional fluid-flow analysis, in response to receiving a selection of a position on the shape data according to an operation of a user, displaying, on the GUI, the analysis result of the low-dimensional fluid-flow analysis of a section in the arithmetic object field, corresponding to the selected position on the shape data, correspondingly with the analysis result of the high-dimensional fluid-flow analysis.

6. A non-transitory computer-readable medium having a simulation program, for executing a fluid-flow analysis of material and for displaying a graphical user interface (GUI), stored thereon and readable by a computer, the simulation program, when executed by the computer, causes the computer to perform operations comprising:

displaying, on the GUI, shape data showing a screw shape relating to an arithmetic object field of a kneading device;

a low-dimensional fluid-flow analysis of the material in the arithmetic object field, based on setting information, the setting information including:
  physical property of the material; and
  configuration data and an operation condition of the kneading device for kneading the material;

receiving, after or before performing the low-dimensional fluid-flow analysis, selection of an object area as an object of a high-dimensional fluid-flow analysis in the arithmetic object field, the selection of the object area being an area selected on the shape data displayed on the GUI;

extracting physical quantities of the material relating to the object area, from among at least two physical quantities obtained from a result of the low-dimensional fluid-flow analysis;

a high-dimensional fluid-flow analysis of the material in the object area, based on the extracted physical quantities and the setting information, wherein at least two of the extracted physical quantities are set as boundary conditions for the high-dimensional fluid-flow analysis; and displaying, on the GUI, an analysis result of the low-dimensional fluid-flow analysis and an analysis result of the high-dimensional fluid-flow analysis, wherein after performing the high-dimensional fluid-flow analysis, in response to receiving a selection of a position on the shape data according to an operation of a user, displaying, on the GUI, the analysis result of the low-dimensional fluid-flow analysis of a section in the arithmetic object field, corresponding to the selected position on the shape data, correspondingly with the analysis result of the high-dimensional fluid-flow analysis.

* * * * *